United States Patent
Mei et al.

(10) Patent No.: US 12,271,399 B2
(45) Date of Patent: Apr. 8, 2025

(54) CROSS-MODAL SEARCH METHOD AND RELATED DEVICE

(71) Applicant: TENCENT TECHNOLOGY (SHENZHEN) COMPANY LIMITED, Shenzhen (CN)

(72) Inventors: Ke Mei, Shenzhen (CN); Huan Zheng, Shenzhen (CN); Ming Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/353,882

(22) Filed: Jul. 18, 2023

(65) Prior Publication Data

US 2023/0359651 A1  Nov. 9, 2023

Related U.S. Application Data

(63) Continuation of application No. PCT/CN2022/134918, filed on Nov. 29, 2022.

(30) Foreign Application Priority Data

Mar. 7, 2022  (CN) .......................... 202210222089.0

(51) Int. Cl.
  *G06F 16/28* (2019.01)
  *G06F 16/24* (2019.01)
  *G06F 16/2455* (2019.01)

(52) U.S. Cl.
  CPC ........ *G06F 16/285* (2019.01); *G06F 16/2455* (2019.01)

(58) Field of Classification Search
  None
  See application file for complete search history.

(56) References Cited

U.S. PATENT DOCUMENTS

| 2014/0164922 A1* | 6/2014 | Soon-Shiong | ............ G06T 7/00 715/716 |
| 2014/0372465 A1 | 12/2014 | Osesina et al. | |
| 2019/0205393 A1 | 7/2019 | Wang et al. | |

FOREIGN PATENT DOCUMENTS

| CN | 102262670 A | 11/2011 |
| CN | 111680173 A | 9/2020 |

(Continued)

OTHER PUBLICATIONS

Lin Zhang; FSIM: A Feature Similarity Index for Image Quality Assessment; IEEE; pp. 2378-2386 (Year: 2011).*

(Continued)

*Primary Examiner* — Ann J Lo
*Assistant Examiner* — Jermaine A Mincey
(74) *Attorney, Agent, or Firm* — ANOVA LAW GROUP PLLC

(57) ABSTRACT

A cross-modal search method includes: acquiring first modality data; searching in a second modality database based on content information of the first modality data to obtain a first set, the first set including at least one piece of second modality data matched with the content information of the first modality data; searching in the second modality database based on semantic information of the first modality data to obtain a second set, the second set including at least one piece of second modality data matched with the semantic information of the first modality data; and merging the first set and the second set to obtain a cross-modal search result corresponding to the first modality data.

15 Claims, 10 Drawing Sheets

(56) References Cited

FOREIGN PATENT DOCUMENTS

| | | |
|---|---|---|
| CN | 112015923 A | 12/2020 |
| CN | 112148831 A | 12/2020 |
| CN | 112199375 A | 1/2021 |
| CN | 113297452 A | 8/2021 |
| CN | 113590850 A | 11/2021 |
| CN | 113627151 A | 11/2021 |
| CN | 113987119 A | 1/2022 |

OTHER PUBLICATIONS

The World Intellectual Property Organization (WIPO) International Search Report for PCT/CN2022/134918 Feb. 8, 2023 10 Pages (including translation).
The State Intellectual Property Office of the People's Republic of China (SIPO) Office Action 1 for 202210222089.0 Apr. 15, 2024 11 Pages (including translation).

* cited by examiner

CROSS-MODAL SEARCH METHOD AND RELATED DEVICE

CROSS-REFERENCES TO RELATED APPLICATIONS

This application is a continuation application of PCT Patent Application No. PCT/CN2022/134918, filed on Nov. 29, 2022, which claims priority to Chinese Patent Application No. 2022102220890, filed with the China National Intellectual Property Administration on Mar. 7, 2022, and entitled "CROSS-MODAL SEARCH METHOD AND RELATED DEVICE", the entire contents of both of which are incorporated herein by reference.

FIELD OF THE TECHNOLOGY

The present disclosure relates to the field of computer technologies, and in particular, to a cross-modal search technology.

BACKGROUND

With the rapid development of the Internet technology, it is an indispensable function for people to search data with a computer device in the production, life, work, and study. It is found in practice that current search generally has problems such as no support for cross-modal search, single search dimension, low search efficiency, incomplete search result, and the like.

SUMMARY

Embodiments of the present disclosure provide a cross-modal search method and a related device, which may improve the cross-modal search efficiency, and the diversity and comprehensiveness of a cross-modal search result.

In an aspect, an embodiment of the present disclosure provides a cross-modal search method, which is performed by a computer device, and includes: acquiring first modality data; searching in a second modality database based on content information of the first modality data to obtain a first set, the first set including at least one piece of second modality data matched with the content information of the first modality data; searching in the second modality database based on semantic information of the first modality data to obtain a second set, the second set including at least one piece of second modality data matched with the semantic information of the first modality data; and merging the first set and the second set to obtain a cross-modal search result corresponding to the first modality data.

In an aspect, an embodiment of the present disclosure provides another cross-modal search method, which is performed by a computer device, and includes: displaying a session interface of a social session; displaying a session record detail interface in response to viewing a historical session record of the social session, the session record detail interface including the second modality data in the historical session record of the social session; outputting the cross-modal search result corresponding to the first modality data in response to the first modality data inputted in the session record detail interface, and the cross-modal search result being obtained by the cross-modal search method according to the embodiments of the present disclosure.

In an aspect, an embodiment of the present disclosure provides a cross-modal search apparatus, including: an acquisition module, configured to acquire first modality data; a search module, configured to search in a second modality database based on content information of the first modality data to obtain a first set, the first set including at least piece of one second modality data matched with the content information of the first modality data; the search module being further configured to search in the second modality database based on semantic information of the first modality data to obtain a second set, the second set including at least one piece of second modality data matched with the semantic information of the first modality data; and a merging module, configured to merge the first set and the second set to obtain the cross-modal search result corresponding to the first modality data.

In an aspect, an embodiment of the present disclosure provides another cross-modal search apparatus, including: a display module, configured to display a session interface of a social session, the display module being further configured to display a session record detail interface in response to viewing a historical session record of the social session, the session record detail interface including the second modality data in the historical session record of the social session; and an output module, configured to output the cross-modal search result corresponding to the first modality data in response to the first modality data inputted in the session record detail interface, and the cross-modal search result being obtained by the cross-modal search method according to the embodiments of the present disclosure.

In an aspect, an embodiment of the present disclosure further provides a computer device, including: at least one processor, at least one memory, and a network interface; and the at least one processor is connected with the at least one memory and the network interface, the network interface is configured to provide a network communication function, the at least one memory is configured to store a program code, and the at least one processor is configured to invoke the program code to execute the cross-modal search method in the embodiments of the present disclosure.

In an aspect, an embodiment of the present disclosure provides a non-transitory computer-readable storage medium. The computer-readable storage medium stores a computer program, the computer program includes a program instruction, and the program instruction, when executed by at least one processor, executes the cross-modal search method in the embodiments of the present disclosure.

In an embodiment of the present disclosure, based on the content information of the first modality data, the second modality data matched with the content information of the first modality data may be searched; based on the semantic information of the first modality data, the second modality data matched with the semantic information of the first modality data may be searched; it is thus clear that the embodiment of the present disclosure not only supports the cross-modal search, but also supports the comprehensive search from two dimensions of content and semantics, so that the dimension of search coverage is no single; in addition, the second modality data searched from the two dimensions are merged as the cross-modal search result, and the search result of multiple dimensions may be obtained by one search process, so that the cross-modal search efficiency is improved; and in addition, since the cross-modal search result is obtained by merging the search results of the two dimensions, the cross-modal search result is more diversified and more comprehensive.

DESCRIPTION OF EMBODIMENTS

The technical solutions in embodiments of the present disclosure are clearly and completely described in the following with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

To better understand the solutions in the embodiments of the present disclosure, relevant terms and concepts that may be involved in the embodiments of the present disclosure are described below first.

Chat photo wall: a full display page in an application (APP) for transmitting and receiving pictures within each chat.

Multi-modal learning: the multi-modal learning refers to that data of two different modes are mapped to a same feature space (such as a semantic space) to enable the data of two different modes to be correlated, the modality data with similar semantics has similar features in the feature space, and the data of two different modes, for example, may be an image and a text.

Based on the above terms and concepts, an architecture of a cross-modal search system provided in the embodiments of the present disclosure is introduced below in combination with the accompanying drawings.

Figure 1:
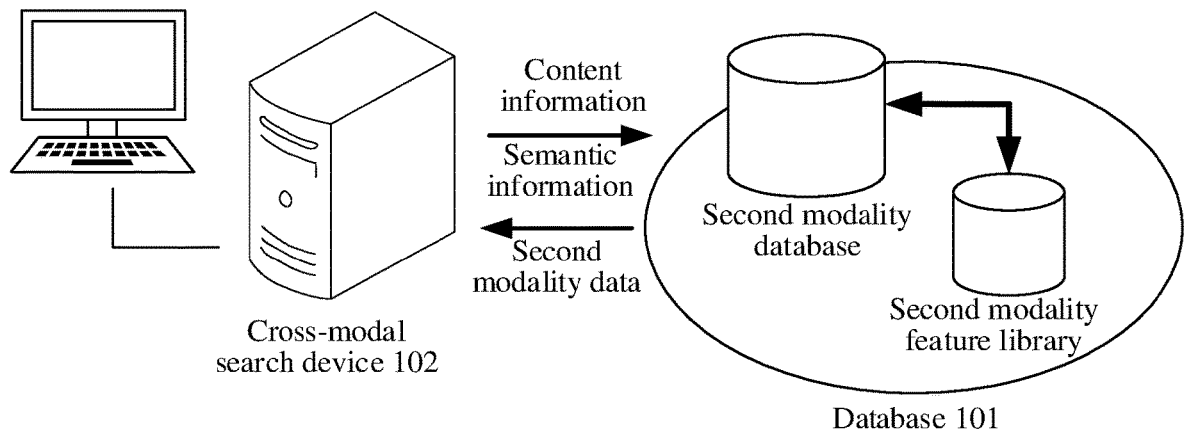
FIG. 1 is an architectural diagram of a cross-modal search system according to an embodiment of the present disclosure.

Referring to FIG. 1, FIG. 1 is a schematic architectural diagram of a cross-modal search system according to an embodiment of the present disclosure. As shown in FIG. 1, the architectural diagram may include a database 101 and a cross-modal search device 102. The cross-modal search device 102 may establish a communication connection with the database 101 in a wired or wireless way. The database 101 may be a local database of the cross-modal search device 102, or may be a cloud database that is accessible to the cross-modal search device 102. The cross-modal search device 102 may be specifically a computer device such as a server, a terminal, or the like.

In the embodiments of the present disclosure, the server may be an independent physical server, a server cluster or a distributed system composed of a plurality of physical servers, or a cloud server providing basic cloud computing services such as cloud services, cloud databases, cloud computing, cloud functions, cloud storage, network services, cloud communications, middleware services, domain name services, security services, CDN, big data, artificial intelligence platforms, and the like, which is not limited here. The terminal may be a smart phone, a tablet computer, an intelligent wearable device, an intelligent voice interaction device, intelligent appliances, a personal computer, vehicle-mounted terminals, and the like, but is not limited thereto.

The database 101 may include a second modality database, and a second modality feature library associated with the second modality database, and the second modality database is configured to store the second modality data and attribute information of the second modality data. In addition, in an implementation, the attribute information of the second modality data may be information contained by the second modality data, for example, in response to that the second modality data is an image, the attribute information may be characters in the image. In another implementation, the attribute information of the second modality data may also be information associated with the second modality data, for example, in response to that the second modality data is the image, the attribute information may be a category label for labeling the image. The second modality feature library is configured to store a semantic feature of the second modality data, the semantic feature of each second modality data is provided with a feature index, and the feature index may assist in quickly searching the second modality data from the second modality database.

The cross-modal search device 102 is configured to search the second modality data according to the first modality data, and further generate the cross-modal search result, and a specific process is as follows: (1) The first modality data is acquired. The first modality data may be any one of text, voice, image, and the like. (2) Based on the content information and the semantic information of the first modality data, the second modality data matched with the content information and the second modality data matched with the semantic information are searched respectively from the database 101 (specifically the second modality database). The content information herein refers to the content contained in the first modality data, and the semantic information refers to an abstract meaning expressed by the first modality data. For example, in response to that the first modality data is the text, the content information is characters in the text, and the semantic information is the meaning expressed by the text. In response to that the first modality data is the image, the content information may be the content contained in the image, such as words; and the semantic information may be a semantic feature extracted from the image. In an embodiment, based on the content information of the first modality data, the second modality data matched with the content information may be found directly from the second modality database; and based on the semantic information of the first modality data, it is necessary to find the second modality feature matched with the semantic information of the first modality data in the second modality feature library with the help of the second modality feature library, and the corresponding second modality data is determined in the second modality database as the second modality data matched with the semantic information according to the second modality feature. (3) The second modality data is merged as the cross-modal search result matched with the first modality data.

The cross-modal search device 102 may also be configured to output the cross-modal search result corresponding to the first modality data according to the inputted first modality data. A specific process includes: (1) Display a session interface of a social session; (2) Display a session record detail interface in response to an operation for viewing a historical session record of the social session, and the session record detail interface displaying the second modality data, and the second modality data belonging to the historical session record of the social session; and (3) Output the cross-modal search result corresponding to the first modality data in response to the first modality data inputted in the session record detail interface. In some embodiments, in the session record detail interface, a search box may be provided for a session object to manually input the first modality data, and the first modality data may also be recommended for the session object to select, so as to quickly trigger a search function for cross-modal search. In an embodiment, the cross-modal search may be performed according to a specified search rule, for example, the inputted text may be searched according to image description, and may also be searched according to the words in the image. In this way, the displayed cross-modal search result may be associated with a search dimension, for example, the second modality data matched with the content information of the first modality data in the cross-modal search result may be outputted, or the second modality data matched with the semantic information of the first modality data in the cross-modal search result may be outputted.

It can be seen from the above that the cross-modal search system supports the following two cross-modal search solutions: one is general cross-modal search at a technical level, the other one is the cross-modal search in the historical session record at a product level, the latter outputs the cross-modal search result, and the cross-modal search result is obtained by implementing the cross-modal search solution at the technical level. Specifically, the cross-modal search device bearing the two solutions may be a same computer device, or may be different computer devices; in response to that the cross-modal search device bearing the two solutions are different computer devices, i.e. a computer device A and a computer device B; the computer device B receives the inputted first modality data, and transmits the first modality data to the computer device A; the computer device A searches in the database based on the acquired first modality data to obtain the cross-modal search result, and then transmits the cross-modal search result to the computer device B; the cross-modal search result is outputted in the computer device B; and in response to that the cross-modal search device bearing the two solutions is the same computer device, e.g., the computer device A, the inputted first modality data may be recognized automatically by the computer device A, and the matched second modality data is searched from the database based on the first modality data to obtain the cross-modal search result, and the cross-modal search result is outputted in the computer device A.

It is thus clear that the cross-modal search system provided in the embodiments of the present disclosure may support searching the second modality data matched with the first modality data in the second modality database respectively based on the content information of the first modality data and the semantic information of the first modality data; the above is a cross-modal search way, which performs the comprehensive search respectively from the two dimensions of content and semantics, so that the dimension of the search coverage is no single, the search for all second modality data associated with the first modality data can be covered, and the search result may be obtained more quickly and more accurately; and in addition, the second modality data searched from the two dimensions is merged as the cross-modal search result, so that the search result of multiple dimensions is obtained by one search process, the cross-modal search effect is improved remarkably, and abundant and comprehensive search results can be obtained. In addition, the cross-modal search system may also provide a search function based on the historical session record of the social session, the search function is to search the second modality data in the historical session record, and all cross-modal search results may be displayed, or the search may be performed according to the specified dimension so as to display the cross-modal search result of the specified dimension. Due to the support of the cross-modal search solution, in response to that the search function is enabled to search the second modality data in the historical session record, the input freedom and complexity of the first modality data can be improved effectively.

In order to better understand the cross-modal search method provided in the embodiments of the present disclosure, scenes in which the cross-modal search method may be applied are described below. Specifically, the cross-modal search method in the embodiments of the present disclosure may be applied to the scene 1 and the scene 2 shown as follows, but is not limited to the application scenes. The scene 1 and the scene 2 are introduced respectively below.

Scene 1: in response to that the first modality data is text data, and the second modality data is image data, search and match are performed for the image data and the text data. In the historical session record of the social session, there are a lot of forms of session messages, such as pictures, videos, files, links, music, and the like, and searching the historical session record is a faster way to reach the historical session message contained in the historical session record. In response to searching for the historical session record in the form of pictures or videos, the manually-inputted text or selected recommended text may be used as the search text, and then the image data matched with the text is outputted, including the pictures or videos. In addition, in response to searching for the pictures or videos in a system photo album of an intelligent terminal, the cross-modal search method in the embodiments of the present disclosure may also be adopted. Similarly, the text may be used as a query input, and the corresponding image data is outputted by matching an image feature in the photo album, and the text information or associated text description information contained in the image.

Scene 2: in response to that the first modality data is audio data, and the second modality data is image data, search and match are performed for the image data and the voice data. By taking a smart phone as an example, most of smart phones are equipped with an intelligent voice function at present, and the terminal device can be controlled by the intelligent voice to automatically execute the corresponding operation. For the massive pictures or videos in the smart phone, the problem involved in the cross-modal search is inquired by voice, that is, the voice is recognized and understood, and voice and the image are mapped to a same feature contrasting space so as to match the corresponding pictures. In addition, the voice may also be converted into the text, and the corresponding pictures or videos are matched by comparing the text with a category label, text description information, or the like of the image. Through the cross-modal search method in the embodiments of the present disclosure, the voice may be used as the query input, and the image matched with the voice is outputted automatically by matching the image content in the photo album of the phone.

Specific implementations of the cross-modal search method provided in the embodiments of the present disclosure are described in detail below in combination with the accompanying drawings.

Figure 2:
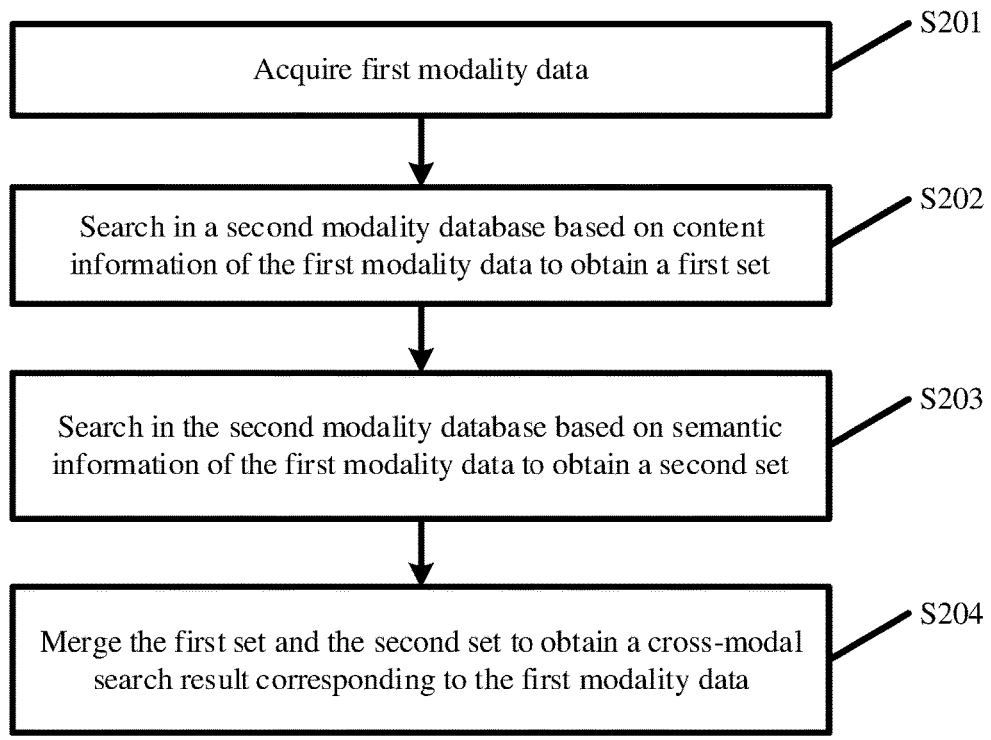
FIG. 2 is a schematic flowchart I of a cross-modal search method according to an embodiment of the present disclosure.

Referring to FIG. 2, FIG. 2 is a schematic flowchart I of a cross-modal search method according to an embodiment of the present disclosure. The cross-modal search method may be performed by a computer device (such as a cross-modal search device 102 shown in FIG. 1). The cross-modal search method includes, but is not limited to the following steps.

S201: Acquire first modality data.

Modality may refer to a source or form of information. For example, people have hearing, sight, smell, and touch, and the media of information include voice, videos, words, pictures, and the like, and each of them may be regarded as a modality. In the embodiments of the present disclosure, the cross-modal search mainly involves in processing an information medium, and specifically, the modality data may be different forms of data such as images, videos, audios, and the like. The acquired first modality data may be modality data inputted by the user with the computer device, in some embodiments, the first modality data may be text data or image data inputted in an auxiliary way such as a physical keyboard, a virtual keyboard, cursor selection, and the like, or may be audio data recognized by an intelligent voice device, or may be selected from the recommended first modality data (such as the recommended text).

S202: Search in a second modality database based on content information of the first modality data to obtain a first set.

The first set includes at least one piece of second modality data matched with the content information of the first modality data. The content information of the first modality data is data information for describing essential content contained in the first modality data. For example, in response to that the first modality data is the text, the corresponding content information may be text characters or key words extracted based on the text; and for another example, in response to that the first modality data is an image, the corresponding content information may be other modality information or basic features contained in the image, such as any one or more of geometric shape, texture, color, object category labels, text description information, and the like contained in the image. Based on the dimension of the content information of the first modality data, all second modality data matched with the content information of the first modality data may be searched in the second modality database, and the matched second modality data is added to the first set.

In an embodiment, the second modality database stores N pieces of second modality data, and respective attribute information of the N pieces of second modality data, and N is a positive integer. The second modality data and the first modality data are two different modality data, the second modality data may be any one of modality data such as text, images, audio, video, and the like, and the second modality data stored in the second modality database may be different in different service scenes. For example, in the historical session record search of the social session, the second modality data may be the image transmitted or received in the session. The attribute information of the second modality data is information describing an attribute of the second modality data, may be associated information recognized from the second modality data or generated by other data, and the attribute information and the content information of the first modality data may be the data in a same record form, such as the text description information. The content information of the first modality data may be matched with the attribute information of the second modality data, so that the matched second modality data is searched in the second modality database to obtain the first set.

In some embodiments, a specific implementation of Step S202 includes the following steps S2021 and S2022: S2021: Determine a match degree between the content information of the first modality data and the attribute information of the second modality data for each second modality data in the N pieces of second modality data as the match degree corresponding to the second modality data; and S2022: Add the second modality data with the corresponding match degree satisfying a match condition to the first set.

The content information of the first modality data may be matched respectively with the attribute information of each second modality data of the N pieces of second modality data in the second modality database to obtain the corresponding match degree. The match degree herein may indicate that the content information of the first modality data is similar to or consistent with the attribute information of the second modality data. The match degree between the content information of the first modality data and the attribute information of the second modality data may be measured by the similarity (such as text similarity) of the modality data, or the abstract semantic similarity, or measured in other ways, which is not limited herein. By judging whether the match degree satisfies the match condition, the second modality data matched with the content information of the first modality data may be searched from the second modality database. The match condition herein may be set as that the match degree is greater than or equal to a match degree threshold, and may also be set as that the match degree is arranged in the first y positions, and y is a positive integer. The specific set content of the match condition is not limited.

In some embodiments, the attribute information includes one or two of first modality description information and the category label, the first modality description information refers to the description information recorded in a form of first modality, for example, in response to that the first modality data is the text, the first modality description information is the text description information; and for another example, in response to that the first modality data is the image, the first modality description information is image description information. The first modality description information as the attribute information of the second modality data may be matched with the content information of the first modality data. In response to that both the content information of the first modality data and the attribute information of the second modality data are recorded in a form of the same modality, the same modality information is matched, so that the second modality data matched with the content information of the first modality data may be more conveniently screened out by comparing the content information of the first modality data with the first modality description information of the second modality data. The category label is information labeled for classifying the second modality data, which may be manually labeled for the second modality data, or obtained by inputting the second modality data to a classification model for multi-label classification. The category label of the second modality data and the content information of the first modality data may also be matched to search the second modality data satisfying the match condition.

For different attribute information, the detail implementation steps of steps S2021 and S2022 are different. For details, refer to the following two implementations. For ease of description, any one of N pieces of second modality data is expressed as an $i^{th}$ second modality data, i is a positive integer, and i is less than or equal to N.

In an implementation, the attribute information includes the first modality description information, and the implementations respectively corresponding to the steps S2021 and S2022 may be: semantic similarity between the content information of the first modality data and the first modality description information of the $i^{th}$ second modality data is determined as the match degree corresponding to the $i^{th}$ second modality data; and in response to that the semantic similarity between the content information of the first modality data and the first modality description information of the $i^{th}$ second modality data is greater than the first similarity threshold, the $i^{th}$ second modality data is added to the first set.

Specifically, the match degree between the content information of the first modality data and the attribute information of the second modality data may adopt the semantic similarity mentioned above, and the semantic similarity may be acquired in the following way: a semantic feature corresponding to the content information of the first modality data, and the semantic feature corresponding to the first modality description information of the $i^{th}$ second modality data are extracted, and then the similarity between the content information of the first modality data and the semantic feature respectively corresponding to the first modality description information of the $i^{th}$ second modality data is determined as the semantic similarity. Whether the $i^{th}$ second modality data satisfies the match condition is determined by judging whether the semantic similarity is greater than the first similarity threshold: in response to that the semantic similarity is greater than the first similarity threshold, it means that the match degree between the attribute information of the $i^{th}$ second modality data and the content information of the first modality data satisfies the match condition, which further shows that the attribute information of the $i^{th}$ second modality data is matched with the content information of the first modality data, so that the $i^{th}$ second modality data may be added to the first set, and otherwise, the $i^{th}$ second modality data may not be added to the first set.

By calculating the semantic similarity between the content information of the first modality data and the first modality description information of the second modality data, the consistence between the content information of the first modality data and expression semantics of the first modality description information of the second modality data may be known, and whether the second modality data is matched with the first modality data may be determined.

Exemplarily, the first modality data is text data, and the second modality data is image data, the specific content of the first modality data is "blue sky and white cloud", and the content information is the text content; and the first modality description information of the second modality data is text description information for the image content, and the text description information is associated with the image, which may be the word information contained in the image, or the text description information associated with the image. In response to that the text description information associated with the image is that "the sky is beautiful today", a key word "sky" may be used as the first modality description information, then the semantic similarity respectively corresponding to two texts "sky" and "blue sky and white cloud" is determined, and whether the two are matched is determined, so that whether the corresponding image is the image matched with the text is determined.

In another implementation, the attribute information includes a category label, and the implementations respectively corresponding to the steps S2021 and S2022 may be: similarity between the content information of the first modality data and the category label of the $i^{th}$ second modality data is determined as the match degree corresponding to the $i^{th}$ second modality data; and in response to that the similarity between the content information of the first modality data and the category label of the $i^{th}$ second modality data is greater than a second similarity threshold, the $i^{th}$ second modality data is added to the first set.

In response to that the attribute information includes the category label, the match degree specifically refers to the similarity between the content information of the first modality data and the category label of the $i^{th}$ second modality data, for example, may be the text similarity, and the similarity may represent a consistence degree between the category label of the second modality data and the content information of the first modality data. In response to that the content information of the first modality data is completely equivalent to the category label of the $i^{th}$ second modality data, the $i^{th}$ second modality data is the second modality data satisfying the match condition; or the content information of the first modality data is similar to the category label, and similarly, the $i^{th}$ second modality data may also be determined as the second modality data satisfying the match condition. Whether the $i^{th}$ second modality data satisfies the match condition may be specifically determined by judging whether the similarity between the content information of the first modality data and the category label of the $i^{th}$ second modality data is greater than the second similarity threshold: in response to that the similarity is greater than the second similarity threshold, it means that the match degree between the content information of the first modality data and the category label of the $i^{th}$ second modality data satisfies the match condition, and further means that the category information of the $i^{th}$ second modality data is matched with the content information of the first modality data, so that the $i^{th}$ second modality data may be added to the first set, and otherwise, the $i^{th}$ second modality data may not be added to the first set.

Exemplarily, when the first modality data is a search text, the second modality data is an image, and the $i^{th}$ second modality data second modality data is a target image and is classified by the classification model into two category labels, i.e. "figures" and "landscapes", in response to that the search text is inputted as the "figures" or the "landscapes", the picture may be matched because the category label is completely the same as the search text, and the similarity used herein may be the text similarity.

It is to be noted that in response to that only the category label is used for searching the picture with the text, and the related pictures can be matched only in response to that the search word is completely the same as the category label, the situation of no search result is likely to occur because of relatively high requirement on the search word, limited supported search words, and single dimension. By integrating the information from other dimensions for search, specifically from the semantic and content dimensions, and reducing the match conditions, for example, the inclusion of the category label may also be regarded as match, not only may the search efficiency be improved, but also the probability that the search result is null may be reduced.

It is to be noted that, the above two implementations are applicable to any second modality data in the N pieces of second modality data, so that after the N pieces of second modality data stored in the second modality database are all matched with the content information of the first modality data in the above way, the finally obtained first set may be used as one part of the following cross-modal search result.

S203: Search in the second modality database based on semantic information of the first modality data to obtain a second set.

The second set includes at least one piece of second modality data matched with the semantic information of the first modality data. The semantic information of the first modality data is used as another information presentation form, and may specifically refer to the meaning represented by an object in a real world corresponding to the first modality data. The semantic information may be used for representing the shadow or deep semantic understanding for the first modality data, the semantic information may be very rich, and for example, in response to that the first modality data is the text, the same semantics may have different text expressions, which is very flexible.

The search is performed in the second modality database by the dimension of the semantic information of the first modality data, which may specifically match the semantic information of the second modality data with the semantic information of the first modality data, so that all second modality data matched with the semantic information of the first modality data are searched from the second modality database to obtain the second set. The semantic information may be expressed by the semantic feature, and may be specifically expressed by a semantic feature vector. Based on the multi-modal learning, the semantic feature of the first modality data and the semantic feature of the second modality data may be extracted respectively, and the semantic features of the two different modality data are mapped to the same semantic feature space for similarity comparison, so as to search the second modality data with similar semantics based on the similar semantic features. For the specific implementation of this step, refer to the introduction of the corresponding embodiment shown in FIG. 3, which is not described in detail herein.

In response to that the first modality data is a text, and the second modality data is an image, this step is a way of searching the picture with the text based on the cross-modal feature, that is, by respectively extracting the text feature vector of the search word and the image feature vector of the picture, the similarity of the feature vectors of two different modalities is compared in the same semantic feature space, so that the images with similar semantics are directly retrieved across modalities by the text description, which may support more text description that is more complex, and realize the input of free and diversified text describing the image to search the target picture.

S204: Merge the first set and the second set to obtain a cross-modal search result corresponding to the first modality data.

The N pieces of second modality data stored in the second modality database are searched according to the above step, so that the first set matched with the content of the first modality data, and the second set matched with the semantics of the first modality data may be obtained. The first set and the second set are merged, which may obtain all second modality data matched with the first modality data, including the second modality data matched with the content information of the first modality data, and the second modality data matched with the semantic information of the first modality data, i.e. the cross-modal search result corresponding to the first modality data, and the obtained cross-modal search result includes the search results of multiple dimensions, which are the diversified and comprehensive search results.

According to the cross-modal search solution provided in the embodiments of the present disclosure, the second modality data matched with the content information of the first modality data may be searched in the second modality database based on the content information of the first modality data, the second modality data matched with the semantic information of the first modality data may be searched in the second modality database based on the semantic information of the first modality data, this search method is not limited to a certain dimension, but performs the comprehensive search from multiple dimensions, so that the dimension of the search coverage is no single; and moreover, the search results of multiple dimensions may be acquired by one search, which improves the cross-modal search efficiency; and in addition, the second modality data matched with two dimensions of the first modality data is merged as the cross-modal search result, which can obtain the richer and more diversified cross-modal search results. The search based on the content information of the first modality data is specifically to use the match degree between the content information of the first modality data and the attribute information (that may be the first modality description information or category label) of the second modality data as a basis, and since the attribute information is most to describe the content contained in the second modality data, correspondingly, the first modality data may not be limited to a fixed expression, but support more diversified and more complex expressions.

Figure 3:
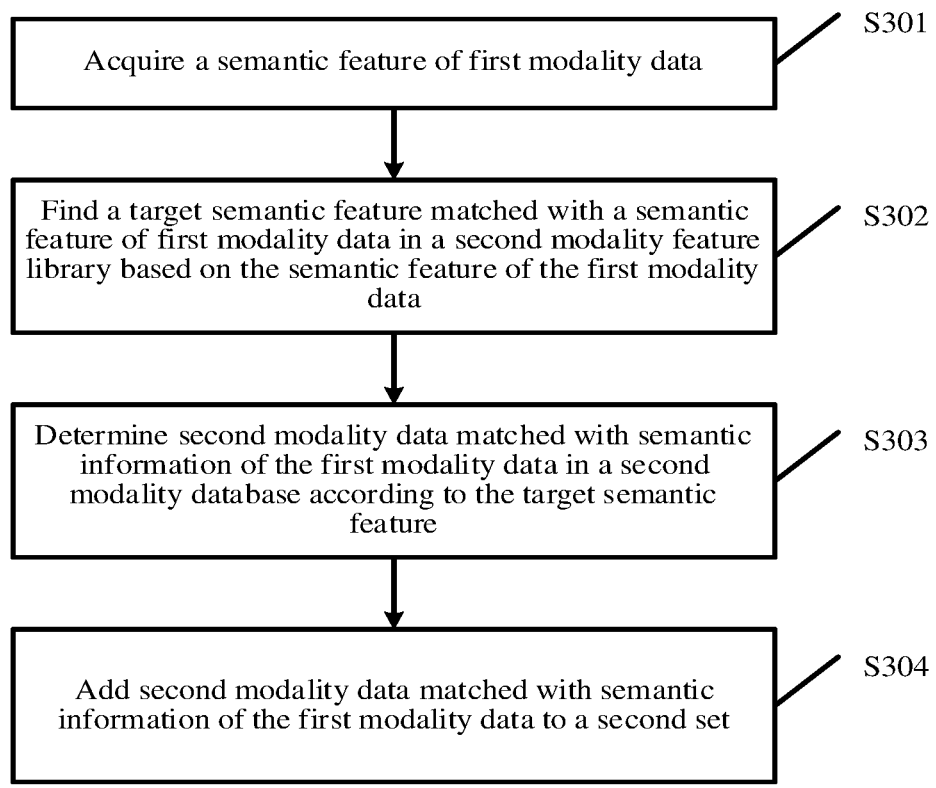
FIG. 3 is a schematic flowchart II of a cross-modal search method according to an embodiment of the present disclosure.

Referring to FIG. 3, FIG. 3 is a schematic flowchart II of a cross-modal search method according to an embodiment of the present disclosure. The method may be performed by a computer device (such as the cross-modal search device 102 shown in FIG. 1). The cross-modal search method of this embodiment is the corresponding step S203 in FIG. 2: the search is performed in the second modality database based on the semantic information of the first modality data to obtain the second set, which corresponds to the detail description of the implementation.

N pieces of second modality data are stored in the second modality database. The second modality data is associated with the second modality feature library, and the second modality feature library stores the semantic features of the N pieces of second modality data. The implementation in which the search is performed in the second modality database based on the semantic information of the first modality data to obtain the second set includes the following steps S301 to S304.

S301: Acquire the semantic feature of the first modality data.

Figure 4A:
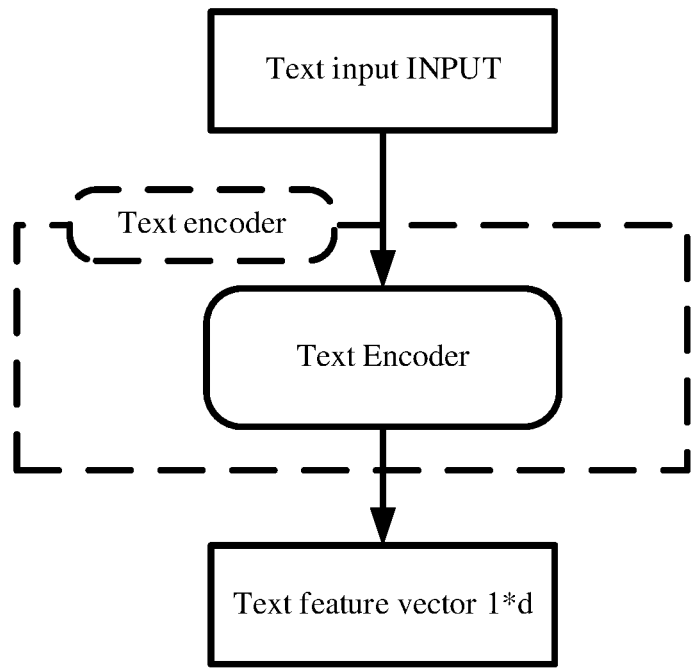
FIG. 4a is a schematic structural diagram of a first modality processing network in a cross-modal search model according to an embodiment of the present disclosure.

In an embodiment, the semantic feature of the first modality data may be obtained by processing with a cross-modal search model, specifically, the cross-modal search model includes a first modality processing network, and a specific implementation of this step may be as follows: feature extraction is performed on the first modality data by the first modality processing network in the cross-modal search model to obtain the semantic feature of the first modality data. The first modality processing network is a processing network for the first modality data. Exemplarily, in response to that the first modality data is a text, the first modality processing network may be a text processing network, and the text processing network may be a bidirectional encoder representation from transformers (BERT) model, and may also be other natural language processing (NLP) models. As shown in FIG. 4a, a schematic diagram of text encoder processing is shown. The text is used as an input, and a text encoder may output a text feature vector.

302: Find a target semantic feature matched with the semantic feature of the first modality data in the second modality feature library based on the semantic feature of the first modality data.

Whether the semantic feature of the first modality data is matched with the semantic feature of the second modality data may be determined by judging whether the similarity between the semantic features of the two modality data is greater than the similarity threshold. Specifically, feature similarity between the semantic features of the N pieces of second modality data stored in the second modality feature library and the semantic feature of the first modality data may be calculated respectively, and the semantic feature of the second modality data with the feature similarity greater than the similarity threshold is determined as the semantic feature of the second modality data matched with the semantic feature of the first modality data, i.e. the target semantic feature. One or more target semantic features may be found from the second modality feature library according to the above way.

Exemplarily, in response to that the first modality data is a text, and the second modality data is an image, the semantic feature corresponding to the first modality data is the text feature vector, the semantic feature corresponding to the second modality data is the image feature vector, and the similar image feature vectors are retrieved from the image feature library by the text feature vector. A specific retrieval way may use the text feature vector and the image feature vector to calculate the feature similarity, and use the image feature vector with the feature similarity greater than the threshold as the target image feature vector matched with the text feature vector.

S303: Determine the second modality data matched with the semantic information of the first modality data in the second modality database according to the target semantic feature.

Since the second modality feature library is associated with the second modality database, the second modality data corresponding to the target semantic feature may be determined from the second modality database by the target semantic feature found in the second modality feature library, and then the second modality data may be used as the second modality data matched with the semantic information of the first modality data.

In an embodiment, the first modality feature library and the second modality database are correlated by a feature index. An implementation of step S303 may specifically include the following steps: (1) Determine a feature index corresponding to the target semantic feature; (2) Determine the second modality data corresponding to the feature index corresponding to the target semantic feature in the second modality database based on the feature index corresponding to the target semantic feature.

The semantic feature of each second modality data in the second modality feature library is associated with the feature index, and each feature index has uniqueness. There is also an association between the feature index and the second modality data in the second modality database, so that the second modality data in the second modality database may be in one-to-one correlation with the semantic feature of the second modality data in the second modality feature library through the feature index. Therefore, the second modality data corresponding to the feature index can be selected from the second modality database based on the feature index corresponding to the found target semantic feature, and the second modality data matched with the semantic information of the first modality data can be obtained.

S304: Add the second modality data matched with the semantic information of the first modality data to the second set.

The second modality data matched with the semantic information of the first modality data and determined from the second modality database may be added to the second set. All second modality data stored in the second modality database may be processed according to the above steps, so that the second modality data matched with the semantic information of the first modality data may be determined. The second modality data is added to the second set one by one, and then the finally obtained second set is used as one part of the cross-modal search result.

The cross-modal search method provided in the embodiments of the present disclosure performs the search from the dimension of the semantic information of the first modality data, extracts the respective semantic features of the first modality data and the second modality data, and compares the semantic feature of the first modality data with the semantic feature of the second modality data in a same semantic space to find the target semantic feature matched with the semantic feature of the first modality data from the second modality feature library, so that the second modality data matched with the semantic information of the first modality data is determined from the second modality database based on the found target semantic feature to obtain the cross-modal search result. This method is essentially a search method based on the cross-modal features. By using the cross-modal features at the semantic level, the search result matched with the first modality data may be more quickly and accurately searched, so that the diversity of the cross-modal search result may be improved to certain extent.

It is thus clear from the foregoing description that the search in the second modality data based on the semantic information of the first modality data needs the help of the second modality feature library, and an acquisition method for the semantic feature of the second modality data stored in the second modality feature library is described in detail below.

In an embodiment, the cross-modal search model includes a second modality processing network, and the semantic features of the N pieces of second modality data stored in the second modality database are obtained by feature extraction on the N pieces of second modality data through the second modality processing network in the cross-modal search model. The second modality processing network is a processing network for the second modality data, and may include multiple networks with different functions. Taking the second modality data that is an image as an example, the second modality processing network may be specifically an image processing network.

In some embodiments, the second modality processing network includes a feature extraction network, a pooling processing network, and a feature integration network; for ease of description, any one of N pieces of second modality data is expressed as an $i^{th}$ second modality data, i is a positive integer, and i is less than or equal to N, that is, all N pieces of second modality data are processed according to the following steps to obtain the corresponding semantic features. Based on this, the step in which feature extraction is performed on the N pieces of second modality data by the second modality processing network in the cross-modal search model to obtain the semantic features of the N pieces of second modality data may specifically include: an initial feature of the $i^{th}$ second modality data is extracted by the feature extraction network in the second modality processing network; pooling processing is performed on the initial feature by the pooling processing network in the second modality processing network to obtain a pooled feature of the $i^{th}$ second modality data; and the pooled features are integrated by the feature integration network to obtain the semantic feature of the $i^{th}$ second modality data.

The feature extraction network may be a depth model for image processing, such as a convolutional neural network (CNN) model, or a vision transformer (VIT) model for feature extraction. The feature extraction network is a backbone network in the second modality processing network, which is mainly configured to extract the initial feature of the second modality data to for the subsequent network to use. The pooling processing network may be configured to perform pooling processing that may be specifically global average pooling (GAP) on the initial feature outputted by the feature extraction network, and then the pooling processing network may also be referred to as a GAP layer. By using the GAP, not only may the number of parameters be reduced, and the over-fitting be prevented, but also the global space information may be integrated, so that the feature of the second modality data is more robust. Then the feature integration network may be invoked to integrate the pooled features outputted by the pooling processing network to obtain the semantic feature of the $i^{th}$ second modality data. The feature integration network may be specifically a feature fully connected layer. Since the fully-connected layer requires that an inputted object to be one-dimensional, the pooled feature needs to be flattened to be a one-dimensional feature before being inputted to the feature integration network, and then the one-dimensional feature is processed by the feature integration network to obtain the semantic feature of the second modality data.

It is to be noted that, the foregoing method is a principle of processing any second modality data in the N pieces of second modality data by the cross-modal search model, that is, for each second modality data of the N pieces of second modality data, the same processing step may be adopted to extract the semantic feature of the second modality data, and then the semantic feature is stored to the second modality feature library.

In one embodiment, the second modality processing network also includes a classification network, specifically classification prediction is performed by the classification network based on the pooled features to obtain the category label of the $i^{th}$ second modality data; and the category label of the $i^{th}$ second modality data is added to the second modality database. The classification network may be a classification fully connected layer, which is similar to the feature fully connected layer. The pooled feature processed by the classification fully connected layer is also a flattened one-dimensional feature. After an output of the classification fully connected layer passes through an activation function (such as a Sigmoid function), a score of the $i^{th}$ second modality data belonging to each category is obtained, and the corresponding category label is obtained. The category labels of the N pieces of second modality data in the second modality database may be acquired by adopting the foregoing classification network for multi-classification processing, and the category label of each second modality data may be added to the second modality database, so that in response to that the first modality data is processed, the second modality data matched with the first modality data is searched according to the similarity between the category label of each second modality data and the content information of the first modality data.

Based on the foregoing description about the second modality processing network, the specific structure of the second modality processing network may be known. It is assumed that the second modality data is the image, and the second modality processing network is specifically an image encoder, including the feature extraction network, the pooling network, the feature integration network, and the classification network, which are specifically the backbone network, the GAP layer, the feature fully connected layer, and the classification fully connected layer. The second modality database is specifically an image library, and the second modality feature library is specifically an image feature vector retrieval set. A processing flow of processing the second modality data by the second modality processing network is exemplarily described below in combination with the structure of the image encoder in the cross-modal search model shown in FIG. 4b.

Figure 4B:
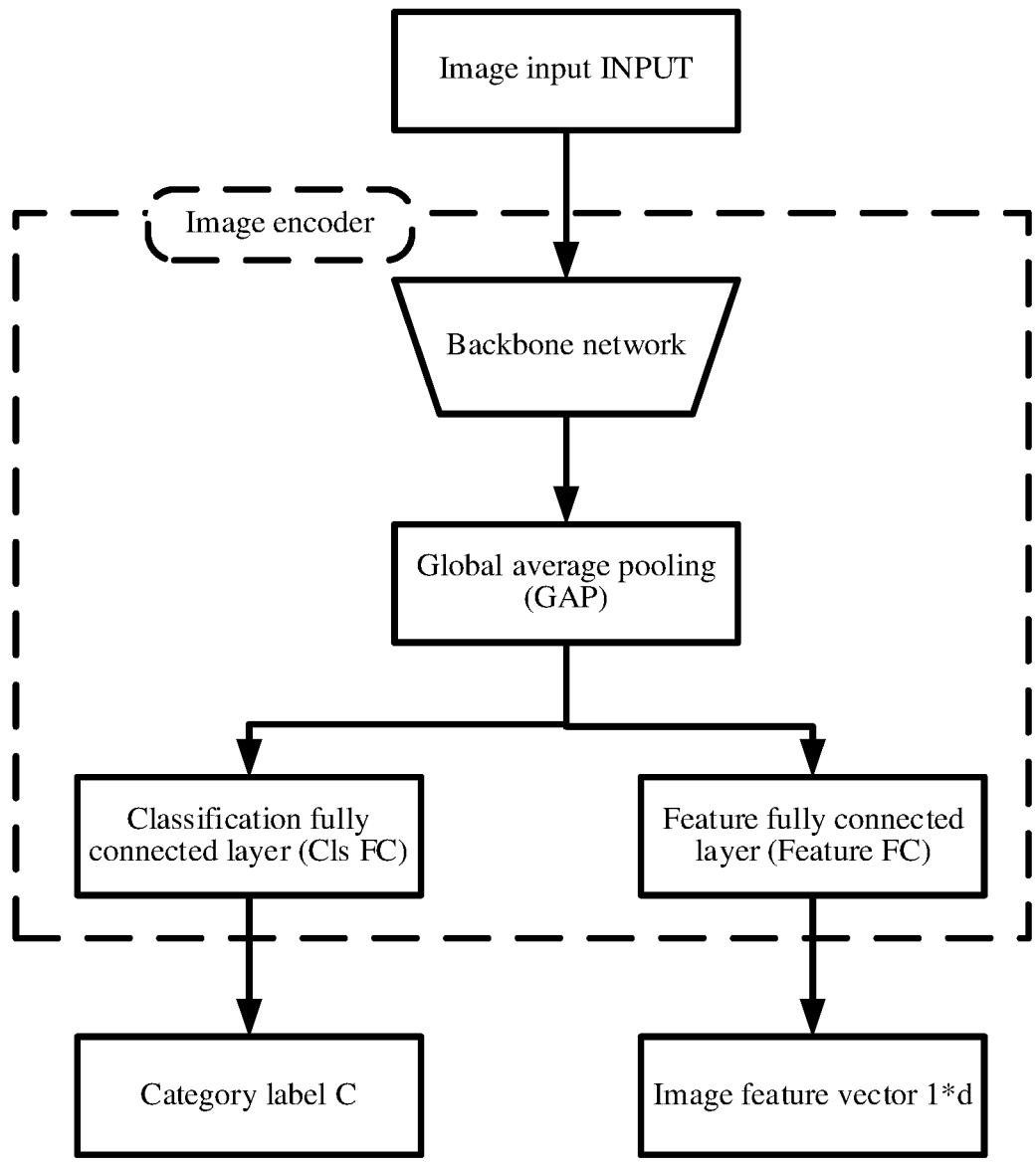
FIG. 4b is a schematic structural diagram of a second modality processing network in a cross-modal search model according to an embodiment of the present disclosure.

The image encoder in the cross-modal search model shown in FIG. 4b specifically includes a backbone network, a GAP layer, a classification fully connected layer, and a feature fully connected layer. It is assumed that the image transmitted or received by a session object in the session is XI, the image XI is inputted to the image encoder, the image encoder may output a multi-label classification result $C_I=\{c_1, c_2, \ldots, c_n\}$ of the image, and a feature vector $f_I$ of the image (or referred to as an image feature vector), and a specific processing flow is as follows: as an input of the image encoder, the image first passes through the backbone network (such as CNN or VIT) of the image encoder to obtain a feature map (the initial feature) of the image, then the feature map of the image is subjected to the GAP processing and flattened into a one-dimensional vector, the flattened one-dimensional vector is inputted to the classification fully connected layer (Cls FC) to output the one-dimensional vector with a length of C, then the one-dimensional vector passes through the Sigmoid function to obtain the score of each category, and the corresponding category label $C_I=\{c_1, c_2, \ldots, c_n\}$ is obtained. At the same time, the one-dimensional vector is also inputted to the feature fully connected layer (feature FC) to output a vector with a length of d (e.g., 512), and after the L2 normalization, the vector is used as the feature vector $f_I$ of the image. The feature vector $f_I$ of the image may be stored in the image feature vector retrieval set (correspondingly the second modality feature library), the category labels of the multi-label classification corresponding to the image may be stored in the second modality database, and finally a corresponding image feature vector index may be added according to the image feature vector $f_I$, and added to the image feature vector retrieval set $G_I$ so as to assist in quickly searching the target image in the image library.

In combination with the first modality processing network in the cross-modal search model shown in FIG. 4a and the second modality processing network in the cross-modal search model shown in FIG. 4b, the cross-modal search model is used for searching, and a specific processing flow for the first modality data is as follows. For ease of description, taking the first modality data that is the text and the first modality processing network that is correspondingly the text encoder as an example for description, the outputted text feature vector and image feature vector are feature vectors mapped to the same semantic feature space and having the same dimension, and the text processing specifically includes: firstly, search is performed in the image library from the content information of the text, and specifically, the image containing the label completely matched with the text query may be inquired from the image library, and the matched image may be recalled as an image set A; at the same time, the text is inputted to the text encoder, the text encoder outputs the vector with a length of d, and after L2 normalization, the text feature vector $f_T$ is obtained; and then the similar image feature vectors are retrieved from the image feature vector retrieval set $G_I$ (the included image feature vector is obtained by processing the image with the image encoder shown in FIG. 4b) by the text feature vector $f_T$, and a corresponding image set B is recalled; and a specific retrieval method is to use the text feature vector $f_T$ and the image feature vector $f_I$ in the retrieval set to calculate the feature similarity, i.e. $S=f_T \cdot f_I$, the retrieved image with the feature similarity S greater than the threshold $\theta$ is used as the image set B, and the image set A and the image set B are finally merged to obtain the cross-modal search result.

In an embodiment, in combination with the foregoing description about the structure and function of the cross-modal search model, the cross-modal search model includes the first modality processing network and the second modality processing network, and a specific training process may be as follows: 1) a cross-modal training dataset is acquired, the cross-modal training dataset includes a plurality of groups of cross-modal sample data, each group of cross-modal sample data includes second modality sample data, first modality sample data, and a match result between the second modality sample data and the first modality sample data; 2) feature extraction is performed on the first modality sample data in the cross-modal sample data by the first modality processing network in the cross-modal search model to obtain a semantic feature of the first modality sample data; feature extraction is performed on the second modality sample data in the cross-modal sample data by the second modality processing network in the cross-modal search model to obtain a semantic feature of the second modality sample data; and 3) iterative training is performed on the cross-modal search model according to a cross-modal contrast loss between the semantic feature of the first modality sample data and the semantic feature of the second modality sample data to obtain the trained cross-modal search model.

At the preparation stage of the training data, the cross-modal training dataset may be acquired from service data generated by corresponding scenes, the cross-modal training dataset is a set of two different modality sample data, and for training of the cross-modal search model, each group of cross-modal sample data may be inputted to the cross-modal search model for processing. For example, in response to that the first modality sample data and the second modality sample data are respectively a text and an image, each group of cross-modal sample data may be an image-text pair, that is, the image and the text description corresponding to the image may constitute the image-text pair, and massive image-text pairs may constitute the cross-modal training dataset.

The training processing for the cross-modal search model is specifically combined training for the first modality processing network and the second modality processing network. K groups of cross-modal sample data may be inputted at the same time. The first modality sample data in an $i^{th}$ group of cross-modal sample data is processed by the first modality processing network to obtain the semantic feature of the first modality sample data. The second modality sample data in the $i^{th}$ group of cross-modal sample data is processed by the second modality processing network to obtain the semantic feature of the second modality sample data. The cross-modal contrast loss is calculated according to the semantic features of the two different modality sample data, and the iterative training is performed on the cross-modal search model based on the cross-modal contrast loss to continuously update the model parameters until convergence, so that the trained model may be obtained.

In response to that the second modality processing network includes a classification processing network, the cross-modal training dataset may also include the category label corresponding to the second modality sample data, and specifically, the training process may also include the following content: classification prediction is performed by the second modality processing network in the cross-modal search model on the second modality sample data in the cross-modal sample data to obtain category prediction information of the second modality sample data; a classification loss of the second modality sample data is determined according to the category prediction information and the category label; and iterative training is performed on the cross-modal search model according to the classification loss and the cross-modal contrast loss to obtain the trained cross-modal search model. The classification prediction information may include a prediction probability that the second modality sample data belongs to each category, the classification loss may use a cross entropy loss, and subsequently the classification loss and the cross-modal contrast loss may be combined as a total loss. For example, weighted summation is performed on the classification loss and the cross-modal contrast loss to obtain the total loss. Then an optimizer (such as a stochastic gradient descent (SGD) optimizer) is used for updating model parameters of the cross-modal search model, and the foregoing training process is continuously repeated until the model parameters are converged to obtain the trained cross-modal search model. Therefore, the cross-modal search model may not only be applied to extract the semantic feature extraction of the first modality data and the second modality data, but also the detection of a match degree between the first modality data and the second modality databased on the cross-modal feature; and the cross-modal search model also has a multi-label classification function, generates the category label for the second modality data, and stores the category label to the second modality database.

In order to better understand the principle of the training stage, taking the first modality processing network that is the text encoder and the second modality processing network that is the image encoder as an example, the training process for the cross-modal search model is described as follows.

Figure 5:
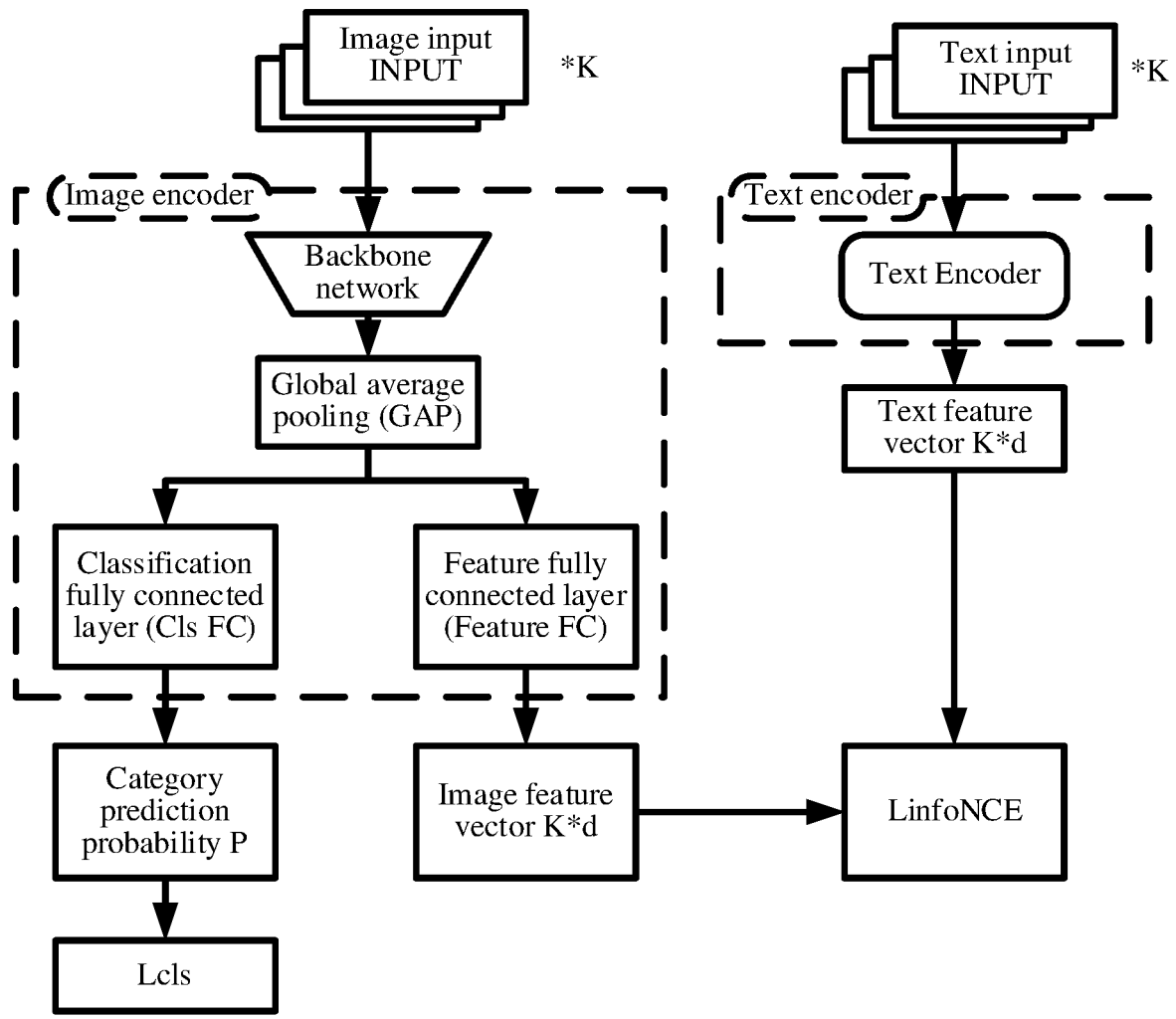
FIG. 5 is a schematic diagram of training of a cross-modal search model according to an embodiment of the present disclosure.

Referring to FIG. 5, FIG. 5 is a schematic diagram of training of a cross-modal search model according to an embodiment of the present disclosure. It is assumed that a cross-modal training dataset includes K groups of image-text pairs, during the training, the K groups of image-text pairs are inputted at the same time, an image feature vector $F_I=\{f_I^0, f_I^1, \ldots, f_I^K\}$ and a text feature vector $F_T=\{f_T^0, f_T^1, \ldots f_T^K\}$ are obtained respectively by an image encoder and a text encoder, and the image encoder also outputs the prediction probability that the category prediction probability PI corresponds to C categories. The cross-modal contrast loss between the image-text pairs may be calculated by an InfoNCE loss, and a specific expression is as follows:

$$L_{infoNCE} = -E\left[\log \frac{\exp(f_I^i \cdot f_T^i / \tau)}{\sum_k^{k \neq i} \exp(f_I^i \cdot f_T^k / \tau)}\right]$$

where $f_I^i$ indicates the $i^{th}$ image feature vector, and $f_T^i$ indicates the $i^{th}$ text feature vector. A main concept of the cross-modal contrast loss is to maximize a similarity loss and minimize a difference loss. Specifically, the image-text pairs may be divided into positive sample pairs and negative sample pairs. The positive sample pairs refer to the image-text pairs that the image and the text description are matched, and the negative sample pairs refer to the image-text pair that the image and the text description are unmatched. In the cross-modal contrast loss, $\exp(f_I^i \cdot f_T^i/\tau)$ indicates similarity between the positive sample pairs, and $\exp(f_I^i \cdot f_T^k/\tau)$ indicates similarity between the negative sample pairs, so that the smaller the cross-modal contrast loss, the more matched the first modality sample data and the second modality sample data.

The classification loss Lis of the image may be calculated by the cross entropy loss (CEL), Lis and LinfoNCE are combined as the total loss, and an SGD optimizer is used for updating the model parameters until convergence.

Figure 6:
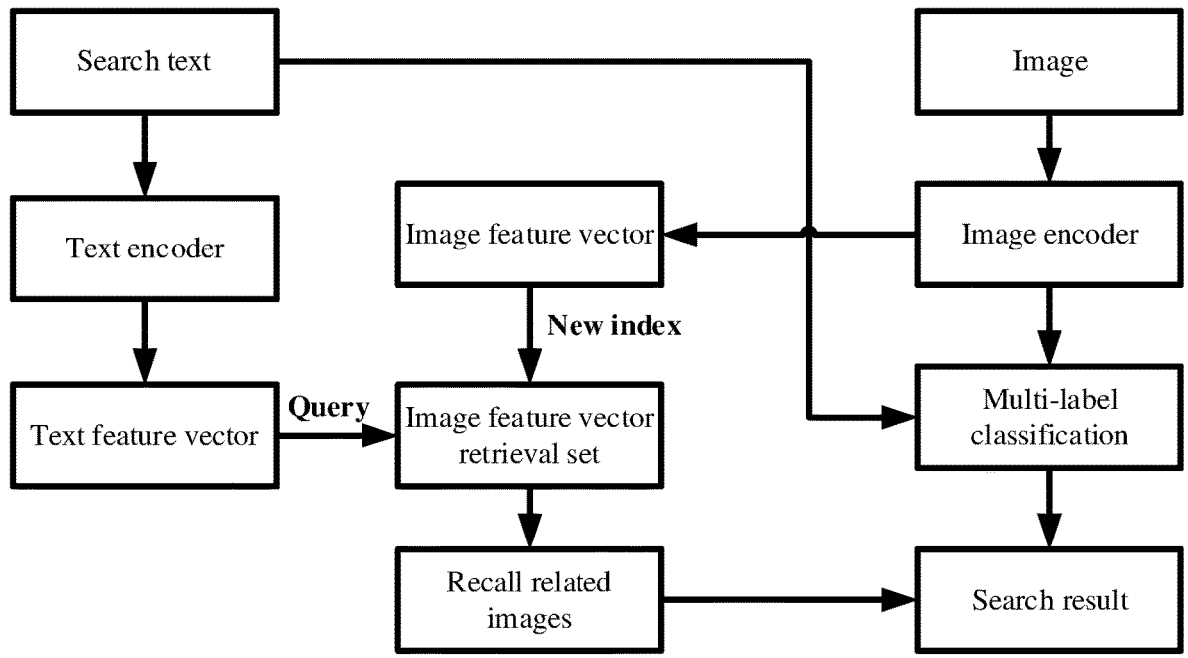
FIG. 6 is a schematic flowchart of a cross-modal search algorithm according to an embodiment of the present disclosure.

Based on the introduction about the above embodiments, taking the first modality data that is the text, and the second modality data that is the image as an example, an algorithm flow adopted in the cross-modal search solution is described, and details may be seen in an algorithm flowchart shown in FIG. 6. The image is inputted to the image encoder for multi-label classification, which may obtain the category label, and in response to that the search text (written as query) is completely the same as the category label, the related images may be matched. In addition, the image encoder may also output the image feature vector, and the image feature vector and the added index are added to the image feature vector retrieval set. The search text query may be inputted to the text encoder to output the text feature vector, then the similar image feature vectors are retrieved from the image feature vector retrieval set based on the text feature vector, and the corresponding image set is recalled based on the similar image feature vectors. Since the solution based on the cross-modal feature search does not depend on a fixed category label system of the classification model, and can support more diversified and more complex text description by matching the features of different modality data, the degree of freedom in inputting the search word can be improved, and the target picture can be found more quickly, more accurately and more comprehensively.

Figure 7:
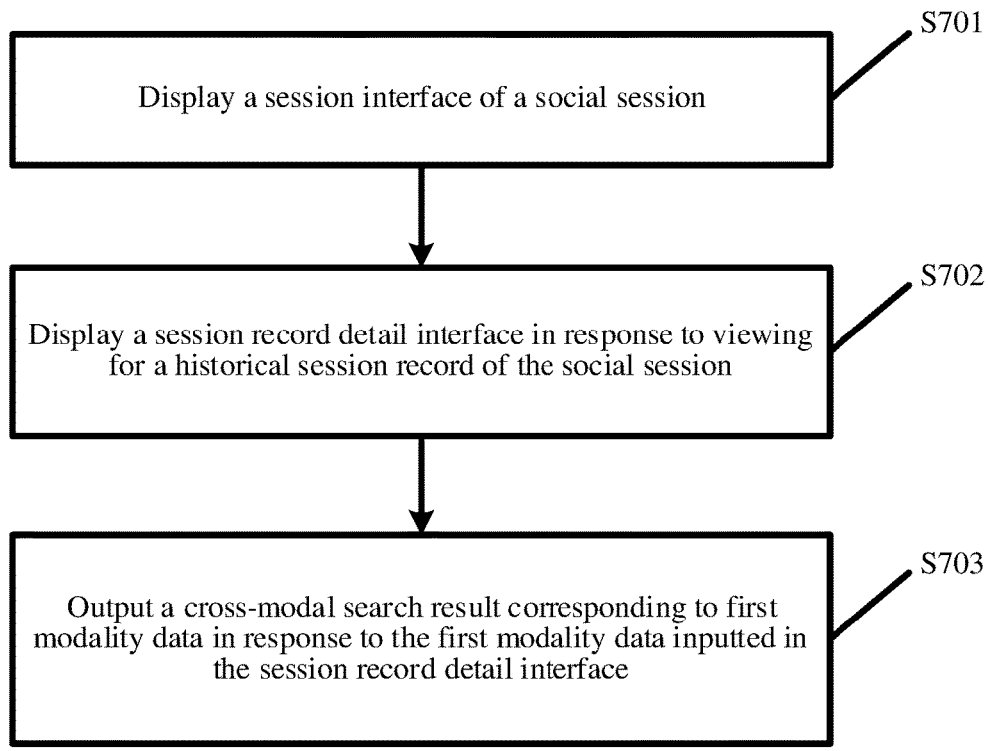
FIG. 7 is a schematic flowchart III of a cross-modal search method according to an embodiment of the present disclosure.

Referring to FIG. 7, FIG. 7 is a schematic flowchart III of a cross-modal search method according to an embodiment of the present disclosure. The cross-modal search method may be performed by a computer device (such as a cross-modal search device 102 shown in FIG. 1, and the cross-modal search device 102 may be specifically a terminal). The cross-modal search method includes, but is not limited to the following steps.

S701: Display a session interface of a social session.

The social session herein may be a session between individuals, or a group session. In the session interface of the social session, a session object may transmit or receive a session message, such as images, texts, voice, and the like. In response to that the session message received in the session interface includes second modality data, a second modality processing network in a cross-modal search model may be invoked to process the second modality data to output a category label of multi-label classification and a semantic feature of the second modality data, then the category label is stored to a second modality database, and the semantic feature (such as an image feature vector) of the second modality data is stored to a second modality feature library.

The session interface of the social session may provide a function for viewing a historical session record. A specific way is to enter a session detail interface from the session interface, the session detail interface includes a viewing entrance of the historical session record, and the session object may initiate a viewing operation via the viewing entrance to view the specific historical session record and perform the search, and details may be seen in the following steps S702 to S703.

S702: Display a session record detail interface in response to viewing the historical session record of the social session.

The session record detail interface includes the second modality data in the historical session record of the social session. The historical session record of the social session may include different modality data, such as images, videos, texts, audio, and the like. The session object may select different modality data to view. The view of the historical session record herein is mainly to view the second modality data. Therefore, in the session record detail interface, the second modality data generated in the historical session record is displayed.

It is to be noted that, in response to that the number of the second modality data is small, the second modality data may be completely displayed in the session record detail interface, and in response to that the number of the second modality data is large, some of the second modality data is displayed in the current session record detail interface. Exemplarily, in response to that the second modality data is an image, the session record detail interface is specifically a chat photo wall, which can display 12 images in a same size; in response to that the number of all images in the historical session record is 10, all images can be displayed in the session record detail interface; in response to that the number of images is greater than 12, 12 images may be displayed at most, and in response to viewing other images, the images may be displayed by performing a downward slide operation; and subsequently, in the session record detail interface, searching the second modality data with the first modality data may be supported, and the second modality data matched with the first modality data, i.e. the cross-modal search result is outputted.

Figure 8A:
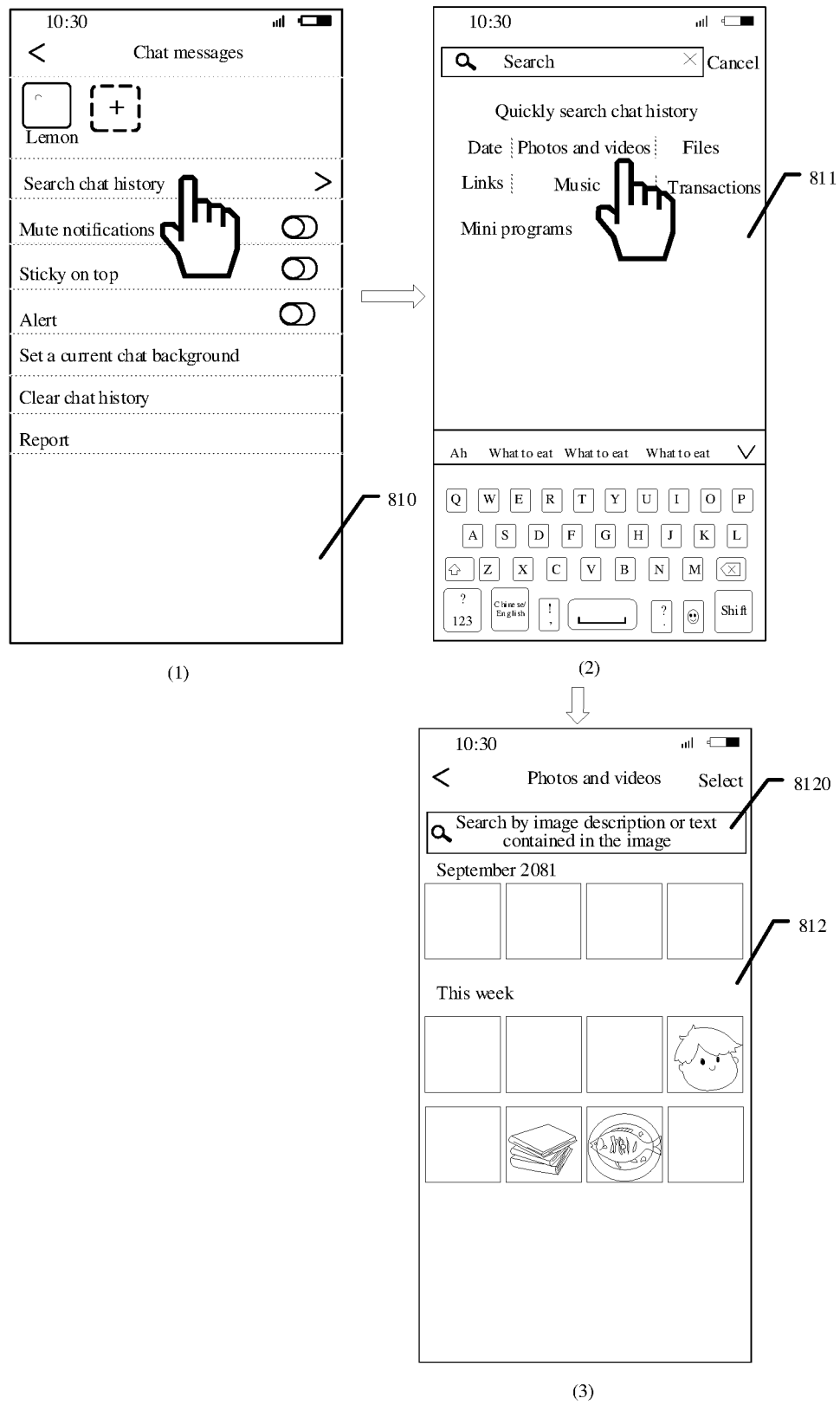
FIG. 8a is a schematic diagram of an operation in viewing a historical session record according to an embodiment of the present disclosure.

Referring to FIG. 8a, FIG. 8a is a schematic diagram of an operation for viewing a historical session record according to an embodiment of the present disclosure. An entrance for finding the historical session record, i.e. "finding chat content" is provided in the session interface 810 of (1) in FIG. 8a; in response to triggering the entrance, it may enter the historical session record search interface 811 shown in (2) in FIG. 8*a*; a corresponding search type may be selected in the historical session record search interface, and the historical session record of this search type is completely displayed; for example, in response to selecting the picture and video, the chat photo wall may be displayed in the session record detail interface 812, and the chat photo wall displays all pictures and videos by date, specifically as shown in (3) of FIG. 8*a*; and moreover, the session record detail interface 812 provides a search box 8120 to facilitate the search of pictures or videos.

In an embodiment, the second modality data in the historical session record of the social session is stored in the second modality database, and the second modality database stores the attribute information of the second modality data. By dividing the second modality data in the historical session record into the second modality database for storage, in response to that the search for the second modality data is initiated, the second modality data may be found directly from the second modality database rather than being found from the global historical session record, which facilitates the improvement of the efficiency in searching the second modality data; and at the same time, the second modality database stores the attribute information of the second modality data, so that the difference of the attribute information may further expand the search dimension.

The attribute information includes at least one of the following: a category label, first modality description information associated with the second modality data, and first modality description information recognized from the second modality data. The category label may be labeling information generated by classifying the second modality data manually or with machines (such as the classification model), and the first modality description information is description information related to the second modality data, which may be specifically recognized from the second modality data, or may be generated in the historical session record and associated with the historical session record. Exemplarily, the second modality data is an image; and in response to that the image in the historical session record contains a text, the text in the image may be obtained by recognizing the image and used as the first modality description information; and in response to that the text description information for the image is transmitted immediately after the session object in the social session transmits the image, for example: "look, the park A changes a lot", the description related to the image may be generated according to the text description information, for example, a key word "park A" may be extracted as the first modality description information of the image.

S703: Output a cross-modal search result corresponding to the first modality data in response to the first modality data inputted in the session record detail interface.

The cross-modal search result is obtained by the cross-modal search method introduced in the foregoing embodiments, and the outputted cross-modal search result includes all second modality data matched with the first modality data inputted in the session record detail interface.

In an embodiment, the first modality data is a text, the second modality data is an image, the session record detail interface includes a search box, and the first modality data is inputted in the search box; or, the session record detail interface also includes at least one recommended text, and the first modality data is selected from at least one recommended text. That is, the first modality data inputted in the session record detail interface may be manually inputted to the search box by an input device (such as a physical/virtual keyboard, and an intelligent voice device), and may also be selected from the recommended text provided in the session record detail interface. In some embodiments, the selected recommended text may be automatically filled in the search box, and the search function is automatically started. The recommended text in the session record detail interface may be generated randomly, or generated according to the attribute information of the second modality data or the semantic feature of the second modality data. With the technical support of the foregoing cross-modal search method, the text inputted in the search box may be the image description conforming to the intuitive expression. In short, taking searching the picture with the text as an example, in response to that the session object searches in the search box, the image of the category label matched with the search text may be inquired in the second modality database and recalled. The search text may be processed by the text encoder in the cross-modal search model to output the corresponding text feature vector. Similar image feature vectors are retrieved from the image feature vector retrieval set, and the corresponding image set is recalled. Finally, all recalled images are merged and displayed to the session object.

Figure 8B:
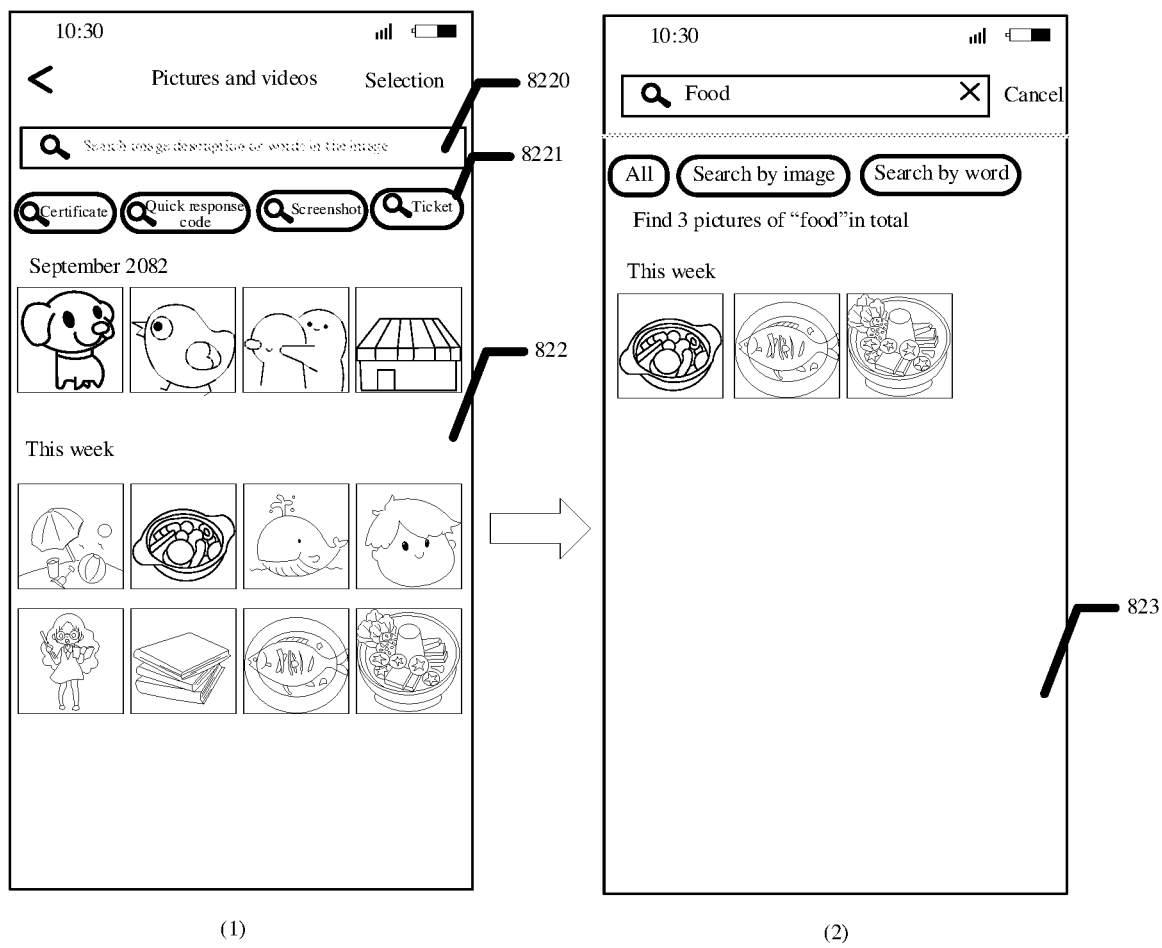
FIG. 8b is a schematic diagram of a cross-modal search operation according to an embodiment of the present disclosure.

Exemplarily, referring to FIG. 8*b*, FIG. 8*b* is a schematic diagram of a cross-modal search operation according to an embodiment of the present disclosure. As shown by (1) in FIG. 8*b*, a session record detail interface provides a search box 8220. In the search box 8220, it is prompted that the search supports the input of image description or words in the picture. The image description is semantic explanation for the content contained in the image, and the words in the image belong to the content information of the image. In addition, the automatically generated recommended text also displays the session record detail interface, such as "ticket", "screenshot", and the like in FIG. 8*b*, and more references and convenient operations may be provided through the recommended text. In response to that the query text is inputted in the search box 8220, and the search function is triggered, a search result interface may be outputted, and the picture matched with the query text may be displayed at the search result interface. As shown by (2) in FIG. 8*b*, three pictures matched with the inputted query text "food" are displayed in the search result interface 823, which belongs to the cross-modal search result.

In an embodiment, it may also be as follows: in response to selection for the first search rule, the second modality data matched with the content information of the first modality data in the cross-modal search result is outputted; or in response to the selection for the second search rule, the second modality data matched with the semantic information of the first modality data in the cross-modal search result is outputted.

The first search rule and the second search rule are rules of searching from different dimensions, and the search may be performed according to different dimensions; and moreover, all cross-modal search results may be classified and displayed according to different search dimensions. The second modality data matched with the content information of the first modality data may be obtained by searching according to the first search rule and outputted, and the second modality data matched with the semantic information of the first modality data may be obtained by searching according to the second search rule, and outputted. That is, a single search dimension may be specified, for example, in response to that the first modality data is the text, and the second modality data is the image, the search may be performed by image or by word. The search by image specifically refers to the search according to the image description, that is, the search is performed by the dimension of matching the semantic information of the image, and the search by word specifically refers to the search according to the words in the image, that is, the search is performed by the dimension of matching the content information of the image.

Figure 8C:
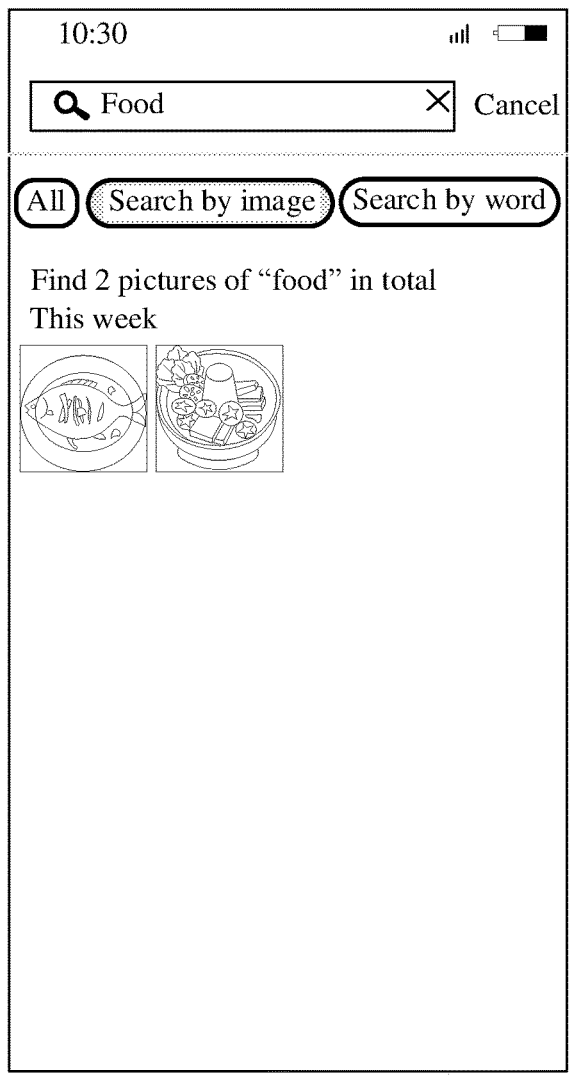
FIG. 8c is a schematic diagram of an effect for outputting a cross-modal search result according to an embodiment of the present disclosure.
Figure 8C:
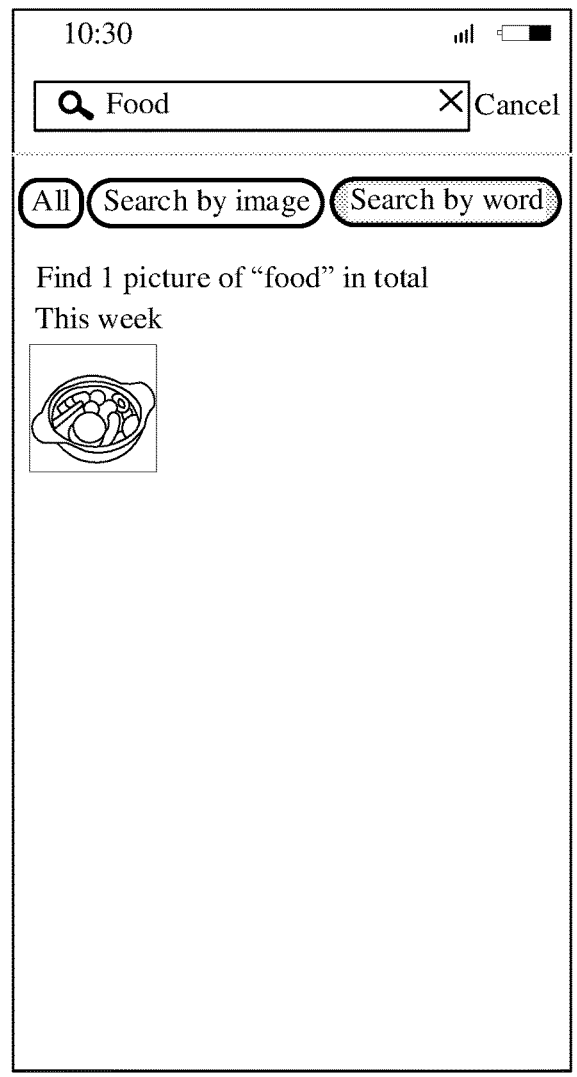

Exemplarily, referring to FIG. 8c, FIG. 8c is a schematic diagram of an effect for outputting a cross-modal search result according to an embodiment of the present disclosure. As shown in FIG. 8c, all pictures matched with the query text and displayed based on the cross-modal search result provided by (2) in FIG. 8b are obtained by searching according to different search dimensions. Different cross-modal search results may be shown when the search by image or the search by word is selected, which are shown by (1) in FIG. 8c and (2) in FIG. 8c, and the search result interface may display pictures that the semantic information of the text is matched with the semantic information of the image, or the content information of the text is matched with the attribute information of the image (such as the category label of the image). This solution may be applied to various scenes, besides the cross-modal search based on the historical session record of the social session introduced in this embodiment, this solution may also be applied to other scenes supporting the multimedia data search, such as a short-video search scene, which is not limited herein.

The cross-modal search solution provided in the embodiments of the present disclosure may support the cross-modal search scene in the historical session record of the social session, and may be specifically applied to the scene of cross-modal search with image and text, that is, the target picture is searched by inputting the search words in the search box; since the cross-modal search is performed from multiple dimensions of the search word, the search word is unnecessary to completely match the category label of the picture, and the corresponding picture can be found; and therefore, finding the target picture by inputting more diversified and more complex image description that is more in line with the intuitive expression not only may improve the degree of input freedom, but also greatly improve the probability of searching the target picture, and improve the diversity of the cross-modal search result; and in addition, the search efficiency can also be improved to certain extent by providing the recommended text (such as the recommended search word).

Figure 9:
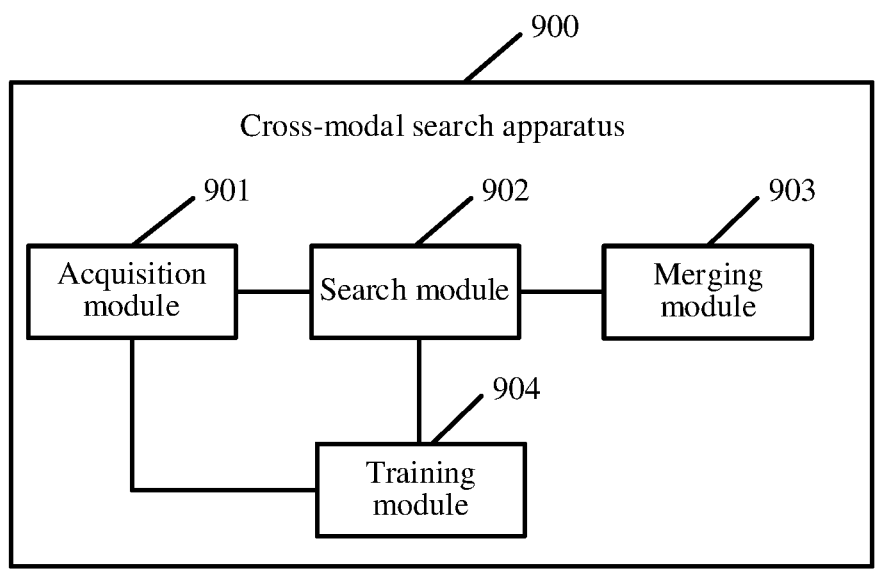
FIG. 9 is a schematic structural diagram of a cross-modal search apparatus according to an embodiment of the present disclosure.

Referring to FIG. 9, FIG. 9 is a schematic structural diagram of a cross-modal search apparatus according to an embodiment of the present disclosure. The cross-modal search apparatus may be a computer program (including a program code) run in a computer device, for example, the cross-modal search apparatus is application software; and the cross-modal search apparatus may be configured to perform corresponding operations in the method provided in the embodiments of the present disclosure. As shown in FIG. 9, the cross-modal search apparatus 900 may include: an acquisition module 901, a search module 902, and a merging module 903.

The acquisition module 901 is configured to acquire first modality data;
the search module 902 is configured to search in a second modality database based on content information of the first modality data to obtain a first set, the first set including at least one second modality data matched with the content information of the first modality data;
the search module 902 is further configured to search in the second modality database based on semantic information of the first modality data to obtain a second set, the second set including at least one second modality data matched with semantic information of the first modality data; and
the merging module 903 is configured to merge the first set and the second set to obtain a cross-modal search result corresponding to the first modality data.

In an embodiment, the second modality database stores N pieces of second modality data, and respective attribute information of the N pieces of second modality data, and N is a positive integer; the search module 902 is specifically configured to: determine a match degree between the content information of the first modality data and the attribute information of the second modality data for each second modality data in the N pieces of second modality data as the match degree corresponding to the second modality data; and add the second modality data with the corresponding match degree satisfying a match condition to the first set.

In an embodiment, the attribute information includes first modality description information; any one of the N pieces of second modality data is expressed as an $i^{th}$ second modality data, i is a positive integer, and i is less than or equal to N; the search module 902 is specifically configured to: determine semantic similarity between the content information of the first modality data and the first modality description information of the $i^{th}$ second modality data as the match degree corresponding to the $i^{th}$ second modality data; and add the $i^{th}$ second modality data to the first set in response to that the semantic similarity between the content information of the first modality data and the first modality description information of the $i^{th}$ second modality data is greater than a first similarity threshold.

In an embodiment, the attribute information includes a category label; any one of N pieces of second modality data is expressed as an it second modality data, i is a positive integer, and i is less than or equal to N; the search module 902 is specifically configured to: determine the similarity between the content information of the first modality data and the category label of the $i^{th}$ second modality data as the match degree corresponding to the $i^{th}$ second modality data; and add the $i^{th}$ second modality data to the first set in response to that the similarity between the content information of the first modality data and the category label of the $i^{th}$ second modality data is greater than a second similarity threshold.

In an embodiment, the second modality database stores N pieces of second modality data; the second modality database is associated with a second modality feature library, and the second modality feature library stores the semantic features of the N pieces of second modality data; and the search module 902 is specifically configured to: acquire a semantic feature of the first modality data; find a target semantic feature matched with the semantic feature of the first modality data in the second modality feature library based on the semantic feature of the first modality data; determine the second modality data matched with the semantic information of the first modality data in the second modality database according to the target semantic feature; and add the second modality data matched with the semantic information of the first modality data to a second set.

In an embodiment, the second modality feature library and the second modality database are correlated by a feature index; the search module 902 is specifically configured to: determine the feature index of the target semantic feature; determine the second modality data corresponding to the feature index of the target semantic feature in the second modality database based on the feature index of the target semantic feature.

In an embodiment, the respective semantic features of the N pieces of second modality data stored in the second modality feature library are obtained by performing feature extraction respectively on the N pieces of second modality data by a second modality processing network in a cross-modal search model; the cross-modal search model also includes a first modality processing network; and the search module 902 is specifically configured to: perform feature extraction on the first modality data by the first modality processing network in the cross-modal search model to obtain the semantic feature of the first modality data.

In an embodiment, the second modality processing network includes a feature extraction network, a pooling processing network, and a feature integration network; any one of N pieces of second modality data is expressed as an $i^{th}$ second modality data, i is a positive integer, and i is less than or equal to N; and the search module 902 is specifically configured to: extract an initial feature of the $i^{th}$ second modality data by the feature extraction network in the second modality processing network; perform pooling processing on the initial feature by the pooling processing network in the second modality processing network to obtain a pooled feature of the $i^{th}$ second modality data; and integrate the pooled features by the feature integration network to obtain the semantic feature of the $i^{th}$ second modality data.

In an embodiment, the second modality processing network also includes a classification network; and the search module 902 is specifically configured to: perform classification prediction by the classification network based on the pooled feature to obtain a category label of the $i^{th}$ second modality data; and add the category label of the $i^{th}$ second modality data to the second modality database.

In an embodiment, the cross-modal search apparatus also includes a training module 904 configured to: acquire a cross-modal training dataset, the cross-modal training dataset including a plurality of groups of cross-modal sample data, each group of cross-modal sample data including second modality sample data, first modality sample data, and a match result between the second modality sample data and the first modality sample data; perform feature extraction on the first modality sample data in the cross-modal sample data by the first modality processing network in the cross-modal search model to obtain the semantic feature of the first modality sample data; perform feature extraction on the second modality sample data in the cross-modal sample data by the second modality processing network in the cross-modal search model to obtain the semantic feature of the second modality sample data; and perform iterative training on the cross-modal search model according to a cross-modal contrast loss between the semantic feature of the first modality sample data and the semantic feature of the second modality sample data to obtain the trained cross-modal search model.

It is to be understood that functions of functional modules of the cross-modal search apparatus in the embodiments of the present disclosure may be specifically implemented according to the method in the foregoing method embodiments. For a specific implementation process of the apparatus, refer to a related description in the foregoing method embodiments. Details are not described herein again. In addition, the description of beneficial effects of the same method are not described herein again.

Figure 10:
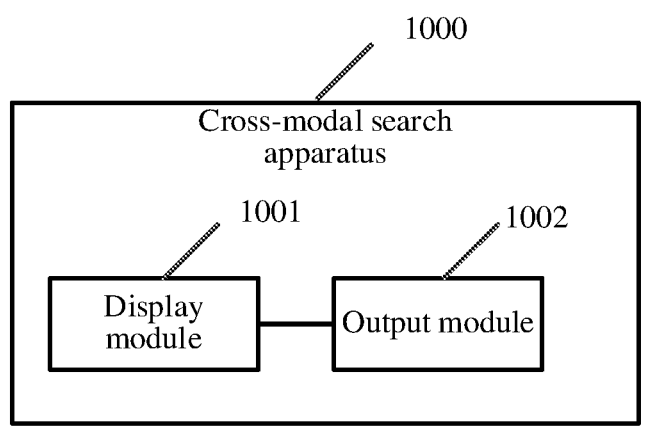
FIG. 10 is a schematic structural diagram of another cross-modal search apparatus according to an embodiment of the present disclosure.

Referring to FIG. 10, FIG. 10 is a schematic structural diagram of another cross-modal search apparatus according to an embodiment of the present disclosure. The cross-modal search apparatus may be a computer program (including a program code) run in a computer device, for example, the cross-modal search apparatus is application software; and the cross-modal search apparatus may be configured to perform corresponding operations in the method provided in the embodiments of the present disclosure. As shown in FIG. 10, the cross-modal search apparatus 1000 may include: a display module 1001 and an output module 1002.

The display module 1001 is configured to display a session interface of a social session;

the display module 1001 is further configured to display a session record detail interface in response to viewing a historical session record of the social session, and the session record detail interface includes second modality data in the historical session record of the social session; and the output module 1002 is configured to output the cross-modal search result corresponding to the first modality data in response to the first modality data inputted in the session record detail interface, and the cross-modal search result is obtained by the cross-modal search method according to the embodiments of the present disclosure.

In an embodiment, the second modality data in the historical session record of the social session is stored in the second modality database, and the second modality database stores the attribute information of the second modality data. The attribute information includes at least one of the following: a category label, first modality description information associated with the second modality data, and first modality description information recognized from the second modality data.

In an embodiment, the first modality data is a text, and the second modality data is an image; the session record detail interface includes a search box, and the first modality data is inputted in the search box; or, the session record detail interface also includes at least one recommended text, and the first modality data is selected from at least one recommended text.

In an embodiment, the output module 1002 is specifically configured to: output the second modality data matched with the content information of the first modality data in the cross-modal search result in response to the selection for a first search rule; or output the second modality data matched with the semantic information of the first modality data in the cross-modal search result in response to the selection for a second search rule.

It is to be understood that functions of functional modules of the cross-modal search apparatus in the embodiments of the present disclosure may be specifically implemented according to the method in the foregoing method embodiments. For a specific implementation process of the apparatus, refer to a related description in the foregoing method embodiments. Details are not described herein again. In addition, the description of beneficial effects of the same method are not described herein again.

It is to be noted that, the cross-modal search apparatus in FIG. 9 and the cross-modal search apparatus in FIG. 10 may be deployed in the same computer device, or may be deployed in different computer devices. In response to that the two cross-modal search apparatuses are deployed in the same computer device, the computer device may automatically search the second modality data matched with the first modality data from the database according to the inputted first modality data to obtain the cross-modal search result, and then the cross-modal search result is outputted in the computer device; and in response to that the apparatuses are deployed in different computer devices, it is assumed that the cross-modal search apparatus in FIG. 9 is deployed in the computer device A, and the cross-modal search apparatus in FIG. 10 is deployed in the computer device B. The computer device B is responsible for receiving the inputted first modality data, and transmitting the first modality data to the computer device A; then the second modality data matched with the first modality data is searched by the computer device A in the second modality database based on the first modality data to obtain the cross-modal search result; and the cross-modal search result is transmitted to the computer device B, and the cross-modal search result is displayed by the computer device B.

Figure 11:
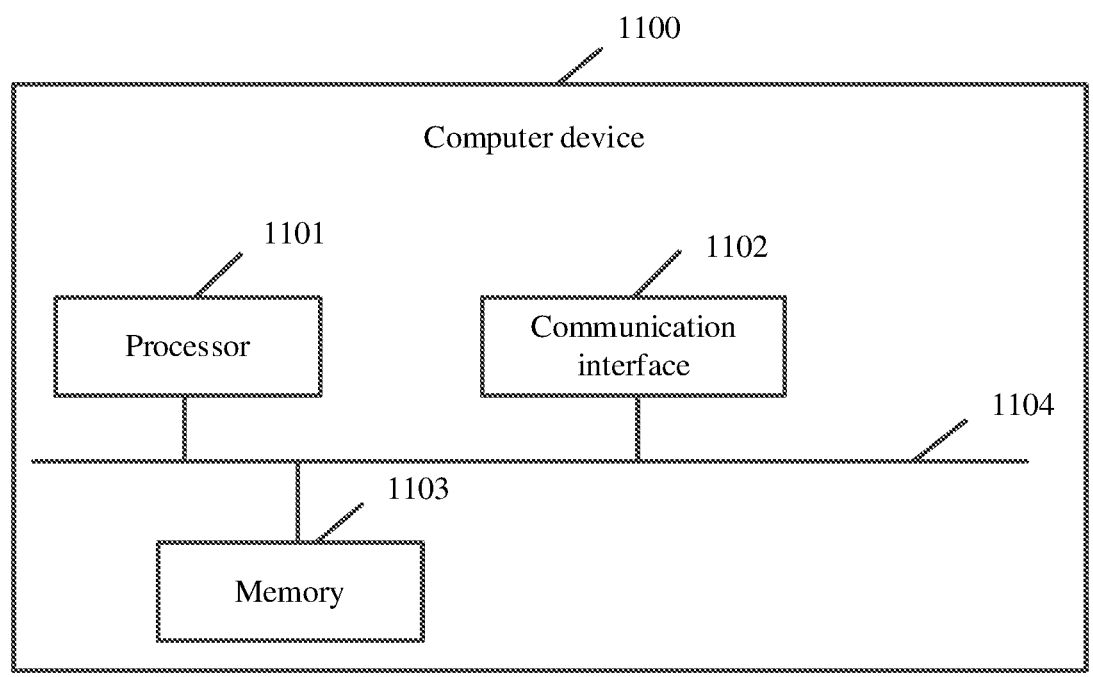
FIG. 11 is a schematic structural diagram of a computer device according to an embodiment of the present disclosure.

Referring to FIG. 11, FIG. 11 is a schematic structural diagram of a computer device according to an embodiment of the present disclosure. The computer device 1100 may include an independent device (such as one or more of a server, a node, a terminal, and the like), and may also include components (such as a chip, a software module, or a hardware module, and the like) inside the independent device. The computer device 1100 may include at least one processor 1101 and a communication interface 1102, and further the computer device 1100 may also include at least one memory 1103 and a bus 1104. The processor 1101, the communication interface 1102, and the memory 1103 are connected by the bus 1104.

The processor 1101 may be a module for arithmetic operation and/or logic operation, and may specifically be one or a combination of more of processing modules such as a central processing unit (CPU), a graphics processing unit (GPU), a microprocessor unit (MPU), an application specific integrated circuit (ASIC), a field programmable gate array (FPGA), a complex programmable logic device (CPLD), a coprocessor (assisting the CPU in completing relevant processing and application), a microcontroller unit (MCU), and the like.

The communication interface 1102 may be configured to provide information input or output for the at least one processor. And/or, the communication interface 1102 may be configured to receive external data and/or transmit data to exterior, may be a wired link interface including, such as an Ethernet cable and the like, may also be a wireless link (Wi-Fi, Bluetooth, general wireless transmission, vehicle-mounted short-distance communication technology, other short-distance wireless communication technologies, and the like) interface.

The memory 1103 is configured to provide a storage space, and the storage space may store data of an operating system, a computer program, and the like. The memory 1103 may be one of or a combination of more of a random access memory (RAM), a read-only memory (ROM), an erasable programmable read-only memory (EPROM), or a compact disc read-only memory (CD-ROM), and the like.

At least one processor 1101 in the computer device 1100 is configured to invoke a computer program stored in at least one memory 1103 to execute the foregoing cross-modal search method, such as the cross-modal search method described in the embodiments shown in FIG. 2, FIG. 3, and FIG. 7.

It is to be understood that the computer device 1100 described in the embodiments of the present disclosure may execute the description of the cross-modal search method in the foregoing embodiments, and may also execute the description of the cross-modal search apparatus 900 described in the corresponding embodiments of FIG. 9 or the cross-modal search apparatus 1000 described in the corresponding embodiment of FIG. 10. Details are not described again herein. In addition, the description of beneficial effects of the same method are not described herein again.

In addition, it is also pointed out that an exemplary embodiment of the present disclosure also provides a storage medium. The storage medium stores the computer program of the foregoing cross-modal search method. The computer program includes a program instruction, and the program instruction, when loaded and executed by one or more processors, may implement the cross-modal search method in the embodiments. Details are not described again herein. The beneficial effects of the same method are not described in detail herein. It is to be understood that the program instruction may be deployed on one or more computer devices that are inter-communicated for execution.

The computer-readable storage medium may be a storage unit inside the cross-modal search apparatus provided in any of the foregoing embodiments or the computer device, such as a hard disc or an internal memory of the computer device. The computer-readable storage medium may also be an external storage device of the computer device, such as a plug-in hard disc, a smart media card (SMC), a secure digital (SD) card, a flash card, and the like arranged on the computer device. Further, the computer-readable storage medium may also include the internal storage unit of the computer device, and include an external storage device. The computer-readable storage medium is configured to store the computer program and other programs and data for the computer device. The computer-readable storage medium may also be configured to temporarily store the outputted data or to-be-outputted data.

In an aspect of the present disclosure, a computer program product or a computer program is provided. The computer program product or the computer program includes a computer instruction, and the computer instruction is stored in a computer-readable storage medium. A processor of the computer device reads the computer instruction from the computer-readable storage medium, and the processor executes the computer instruction to make the computer device execute the method provided in an aspect of the foregoing embodiments.

In an aspect, an embodiment of the present disclosure provides another computer program product. The computer program product includes a computer program or a computer instruction. The computer program or the computer instruction, when executed by a processor, implements the steps of the cross-modal search method provided in the embodiments of the present disclosure.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A cross-modal search method, performed by a computer device, and comprising:
    displaying, on a display screen of the computer device, a session interface of a social session;
    displaying, on the display screen, a session record detail interface in response to a selection of viewing a historical session record of the social session, the historical session record of the social session comprising second modality data;

displaying, on the session record detail interface, a search box and a plurality of options about modality types;

detecting a selected option of modality type and first modality data inputted in the session record detail interface;

searching in a second modality database based on content information of the first modality data to obtain a first set, the first set comprising at least one piece of the second modality data matched with the content information of the first modality data, the second modality data having the selected modality type;

searching in the second modality database based on semantic information of the first modality data to obtain a second set, the second set comprising at least one piece of second modality data matched with the semantic information of the first modality data; and presenting, in the session record detail interface on the display screen, a cross-modal search result corresponding to the first modality data based on the first set and the second set, wherein:

the second modality database stores N pieces of second modality data and respective attribute information of the N pieces of second modality data, and N is a positive integer;

the attribute information comprises first modality description information; one of the N pieces of second modality data is denoted as an $i^{th}$ second modality data, i is a positive integer, and i is less than or equal to N; and the searching in the second modality database to obtain the first set comprises:

determining a match degree between the content information of the first modality data and the attribute information of a piece of the second modality data in the N pieces of second modality data as a match degree corresponding to the piece of second modality data, comprising:

determining semantic similarity between the content information of the first modality data and the first modality description information of the $i^{th}$ second modality data in the N pieces of second modality data as the match degree corresponding to the $i^{th}$ second modality data; and adding the piece of the second modality data with the corresponding match degree satisfying a match condition to the first set, comprising:

adding the $i^{th}$ second modality data to the first set in response to that the semantic similarity between the content information of the first modality data and the first modality description information of the $i^{th}$ second modality data is greater than a first similarity threshold.

2. The method according to claim 1, wherein the second modality database stores N pieces of second modality data, and respective attribute information of the N pieces of second modality data, and N is a positive integer; and the searching in a second modality database based on content information of the first modality data to obtain a first set comprises:

determining a match degree between the content information of the first modality data and the attribute information of a piece of the second modality data in the N pieces of second modality data as a match degree corresponding to the piece of second modality data; and adding the piece of the second modality data with the corresponding match degree satisfying a match condition to the first set.

3. The method according to claim 1, wherein the second modality database stores N pieces of second modality data; the second modality database is associated with a second modality feature library, and the second modality feature library stores respective semantic features of the N pieces of second modality data; and the searching in the second modality database based on semantic information of the first modality data to obtain a second set comprises:

acquiring a semantic feature of the first modality data;

finding a target semantic feature matched with the semantic feature of the first modality data in the second modality feature library based on the semantic feature of the first modality data;

determining a piece of the second modality data matched with the semantic information of the first modality data in the second modality database according to the target semantic feature; and adding the piece of the second modality data matched with the semantic information of the first modality data to the second set.

4. The method according to claim 3, wherein the second modality feature library and the second modality database are correlated by a feature index; and the determining the piece of the second modality data matched with the semantic information of the first modality data in the second modality database according to the target semantic feature comprises:

determining the feature index of the target semantic feature; and determining the piece of the second modality data corresponding to the feature index of the target semantic feature in the second modality database based on the feature index of the target semantic feature.

5. The method according to claim 3, wherein the respective semantic features of the N pieces of second modality data stored in the second modality feature library are obtained by performing feature extraction respectively on the N pieces of second modality data by a second modality processing network in a cross-modal search model; the cross-modal search model further comprises a first modality processing network; and the acquiring a semantic feature of the first modality data comprises:

performing feature extraction on the first modality data by the first modality processing network in the cross-modal search model to obtain the semantic feature of the first modality data.

6. The method according to claim 5, wherein the second modality processing network comprises a feature extraction network, a pooling processing network, and a feature integration network; one of the N pieces of second modality data is denoted as an $i^{th}$ second modality data, i is a positive integer, and i is less than or equal to N; and the performing feature extraction respectively on the N pieces of second modality data by a second modality processing network in a cross-modal search model to obtain respective semantic features of the N pieces of second modality data comprises:

extracting an initial feature of the $i^{th}$ second modality data by the feature extraction network in the second modality processing network;

performing pooling processing on the initial feature by the pooling processing network in the second modality processing network to obtain a pooled feature of the $i^{th}$ second modality data; and integrating the pooled features by the feature integration network to obtain the semantic feature of the $i^{th}$ second modality data.

7. The method according to claim 6, wherein the second modality processing network further comprises a classification network; and the method further comprises:
  performing classification prediction by the classification network based on the pooled feature to obtain a category label of the $i^{th}$ second modality data; and
  adding the category label of the $i^{th}$ second modality data to the second modality database.

8. The method according to claim 5, further comprising:
  acquiring a cross-modal training dataset, the cross-modal training dataset comprising a plurality of groups of cross-modal sample data, each group of cross-modal sample data comprising second modality sample data, first modality sample data, and a match result between the second modality sample data and the first modality sample data;
  performing feature extraction on the first modality sample data in the cross-modal sample data by the first modality processing network in the cross-modal search model to obtain the semantic feature of the first modality sample data;
  performing feature extraction on the second modality sample data in the cross-modal sample data by the second modality processing network in the cross-modal search model to obtain the semantic feature of the second modality sample data; and
  performing iterative training on the cross-modal search model according to a cross-modal contrast loss between the semantic feature of the first modality sample data and the semantic feature of the second modality sample data to obtain the trained cross-modal search model.

9. The method according to claim 1, wherein the second modality data in the historical session record of the social session is stored in the second modality database, the second modality database stores attribute information of N pieces of second modality data, and the attribute information comprises at least one of the following: a category label, first modality description information associated with a piece of the second modality data, and first modality description information recognized from the piece of the second modality data.

10. The method according to claim 1, wherein the first modality data is a text, and the second modality data is an image; the session record detail interface comprises a search box, and the first modality data is inputted in the search box; or the session record detail interface further comprises at least one recommended text, and the first modality data is selected from the at least one recommended text.

11. The method according to claim 1, further comprising:
  outputting a piece of second modality data matched with content information of the first modality data in the cross-modal search result in response to selection for a first search rule; or outputting the piece of second modality data matched with semantic information of the first modality data in the cross-modal search result in response to selection for a second search rule.

12. A cross-modal search apparatus, comprising:
  at least one processor, and at least one memory;
  the at least one memory being configured to store a program code, and the at least one processor being configured to invoke the program code to perform:
  displaying, on a display screen of the computer device, a session interface of a social session;
  displaying, on the display screen, a session record detail interface in response to a selection of viewing a historical session record of the social session, the historical session record of the social session comprising second modality data;
  displaying, on the session record detail interface, a search box and a plurality of options about modality types;
  detecting a selected option of modality type and first modality data inputted in the session record detail interface;
  searching in a second modality database based on content information of the first modality data to obtain a first set, the first set comprising at least one piece of the second modality data matched with the content information of the first modality data, the second modality data having the selected modality type;
  searching in the second modality database based on semantic information of the first modality data to obtain a second set, the second set comprising at least one piece of second modality data matched with the semantic information of the first modality data; and
  presenting, in the session record detail interface on the display screen, a cross-modal search result corresponding to the first modality data based on the first set and the second set,
  wherein:
  the second modality database stores N pieces of second modality data and respective attribute information of the N pieces of second modality data, and N is a positive integer;
  the attribute information comprises first modality description information; one of the N pieces of second modality data is denoted as an $i^{th}$ second modality data, i is a positive integer, and i is less than or equal to N; and
  the searching in the second modality database to obtain the first set comprises:
    determining a match degree between the content information of the first modality data and the attribute information of a piece of the second modality data in the N pieces of second modality data as a match degree corresponding to the piece of second modality data, comprising:
      determining semantic similarity between the content information of the first modality data and the first modality description information of the $i^{th}$ second modality data in the N pieces of second modality data as the match degree corresponding to the $i^{th}$ second modality data; and
    adding the piece of the second modality data with the corresponding match degree satisfying a match condition to the first set, comprising:
      adding the $i^{th}$ second modality data to the first set in response to that the semantic similarity between the content information of the first modality data and the first modality description information of the $i^{th}$ second modality data is greater than a first similarity threshold.

13. The apparatus according to claim 12, wherein the second modality database stores N pieces of second modality data, and respective attribute information of the N pieces of second modality data, and N is a positive integer; and the searching in a second modality database based on content information of the first modality data to obtain a first set comprises:
  determining a match degree between the content information of the first modality data and the attribute information of a piece of the second modality data in the N pieces of second modality data as a match degree corresponding to the piece of second modality data; and adding the piece of the second modality data with the corresponding match degree satisfying a match condition to the first set.

14. The apparatus according to claim 12, wherein the second modality database stores N pieces of second modality data; the second modality database is associated with a second modality feature library, and the second modality feature library stores respective semantic features of the N pieces of second modality data; and the searching in the second modality database based on semantic information of the first modality data to obtain a second set comprises:
   acquiring a semantic feature of the first modality data;
   finding a target semantic feature matched with the semantic feature of the first modality data in the second modality feature library based on the semantic feature of the first modality data;
   determining a piece of the second modality data matched with the semantic information of the first modality data in the second modality database according to the target semantic feature; and
   adding the piece of the second modality data matched with the semantic information of the first modality data to the second set.

15. A non-transitory computer-readable storage medium, the computer-readable storage medium storing a computer program, the computer program comprising a program instruction, the computer instruction, when executed by at least one processor, causing the at least one processor to perform:
   displaying, on a display screen of the computer device, a session interface of a social session;
   displaying, on the display screen, a session record detail interface in response to a selection of viewing a historical session record of the social session, the historical session record of the social session comprising second modality data;
   displaying, on the session record detail interface, a search box and a plurality of options about modality types;
   detecting a selected option of modality type and first modality data inputted in the session record detail interface;
   searching in a second modality database based on content information of the first modality data to obtain a first set, the first set comprising at least one piece of the second modality data matched with the content information of the first modality data, the second modality data having the selected modality type;
   searching in the second modality database based on semantic information of the first modality data to obtain a second set, the second set comprising at least one piece of second modality data matched with the semantic information of the first modality data; and
   presenting, in the session record detail interface on the display screen, a cross-modal search result corresponding to the first modality data based on the first set and the second set, wherein:
   the second modality database stores N pieces of second modality data and respective attribute information of the N pieces of second modality data, and N is a positive integer;
   the attribute information comprises first modality description information; one of the N pieces of second modality data is denoted as an $i^{th}$ second modality data, i is a positive integer, and i is less than or equal to N; and
   the searching in the second modality database to obtain the first set comprises:
      determining a match degree between the content information of the first modality data and the attribute information of a piece of the second modality data in the N pieces of second modality data as a match degree corresponding to the piece of second modality data, comprising:
         determining semantic similarity between the content information of the first modality data and the first modality description information of the $i^{th}$ second modality data in the N pieces of second modality data as the match degree corresponding to the $i^{th}$ second modality data; and
      adding the piece of the second modality data with the corresponding match degree satisfying a match condition to the first set, comprising:
         adding the $i^{th}$ second modality data to the first set in response to that the semantic similarity between the content information of the first modality data and the first modality description information of the $i^{th}$ second modality data is greater than a first similarity threshold.

* * * * *